March 23, 1965  E. MARTIN  3,174,751
PIN SETTING MECHANISM WITH MEANS FOR SETTING
SELECTED PINS ON CORRELATED PIN SPOTS
Filed June 23, 1961  17 Sheets-Sheet 1
FIG. IA
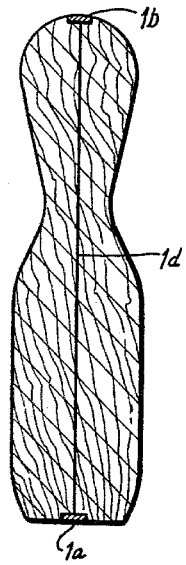
FIG. IB
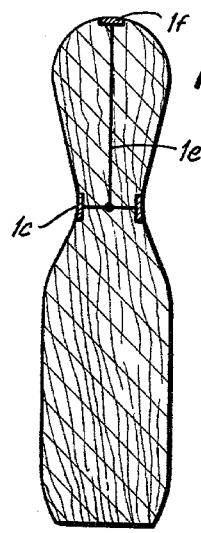
FIG. IE
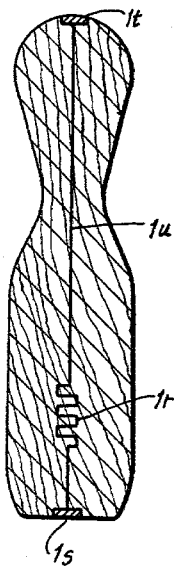
FIG. IC
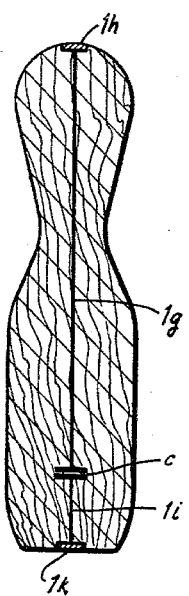
FIG. ID
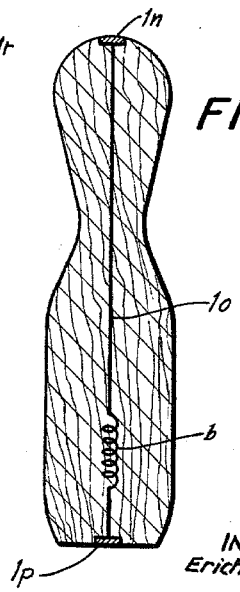
INVENTOR
Erich MARTIN
by Michael S. Striker
Attorney March 23, 1965 E. MARTIN 3,174,751
PIN SETTING MECHANISM WITH MEANS FOR SETTING
SELECTED PINS ON CORRELATED PIN SPOTS
Filed June 23, 1961 17 Sheets-Sheet 2

INVENTOR
Erich MARTIN

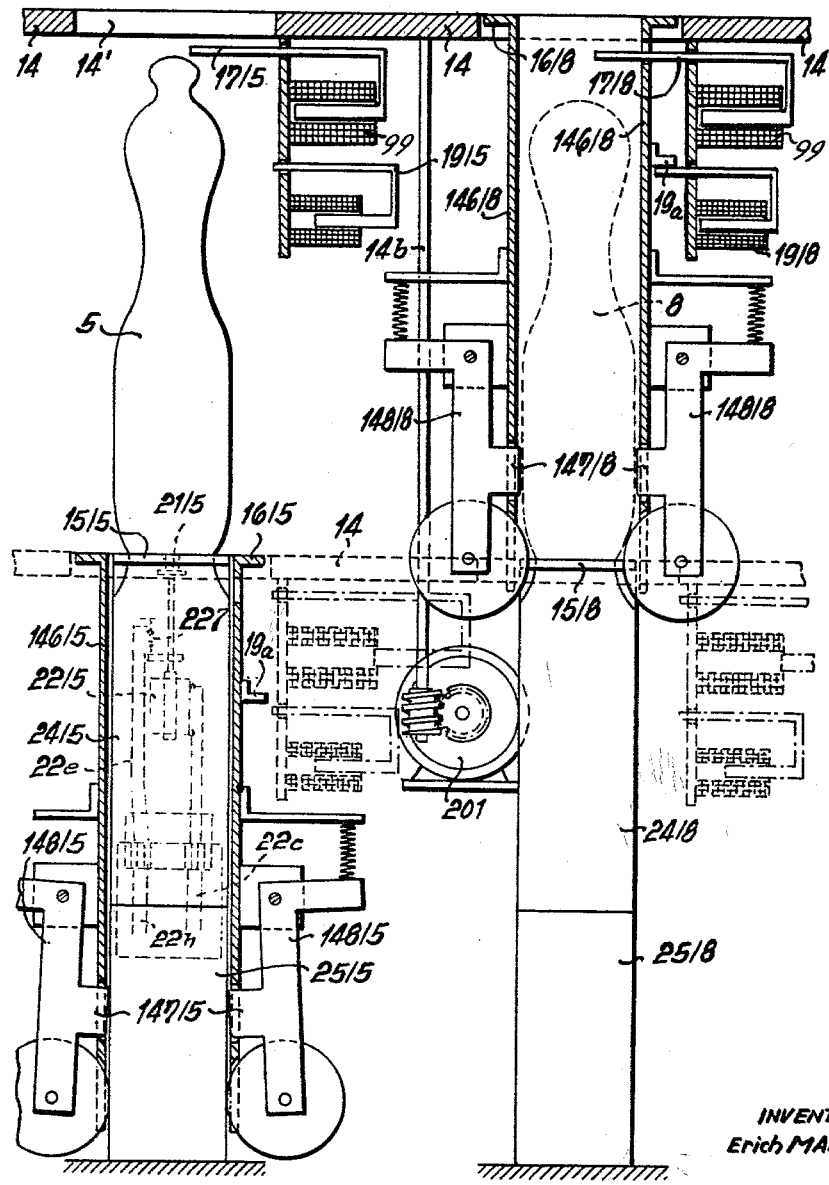

March 23, 1965　　　　　E. MARTIN　　　　　3,174,751
PIN SETTING MECHANISM WITH MEANS FOR SETTING
SELECTED PINS ON CORRELATED PIN SPOTS
Filed June 23, 1961　　　　　　　　　　17 Sheets-Sheet 4
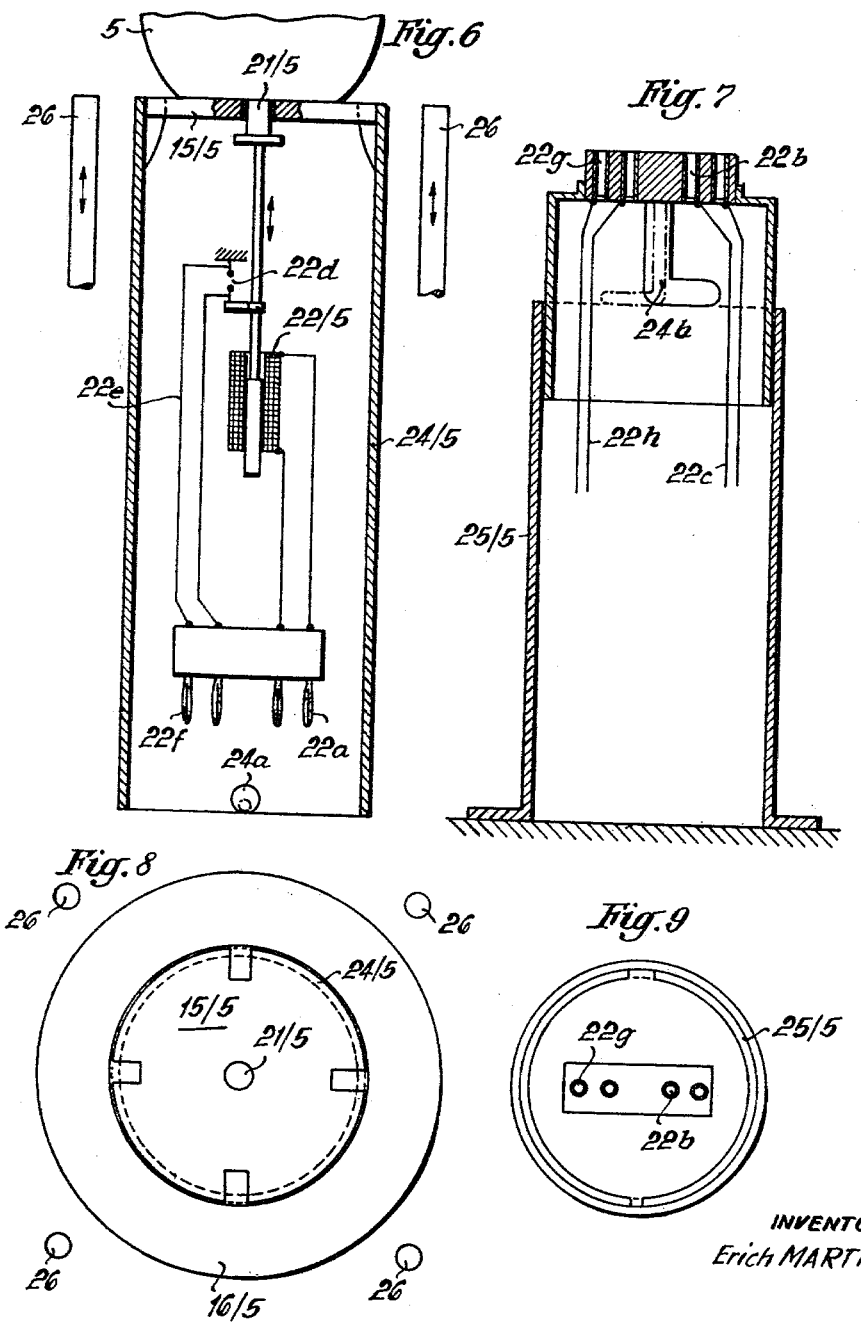
INVENTOR
Erich MARTIN March 23, 1965 E. MARTIN 3,174,751
PIN SETTING MECHANISM WITH MEANS FOR SETTING
SELECTED PINS ON CORRELATED PIN SPOTS
Filed June 23, 1961 17 Sheets-Sheet 5
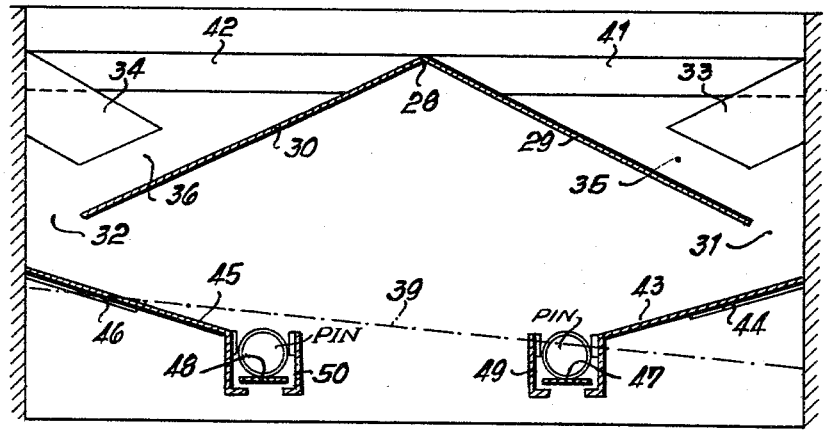
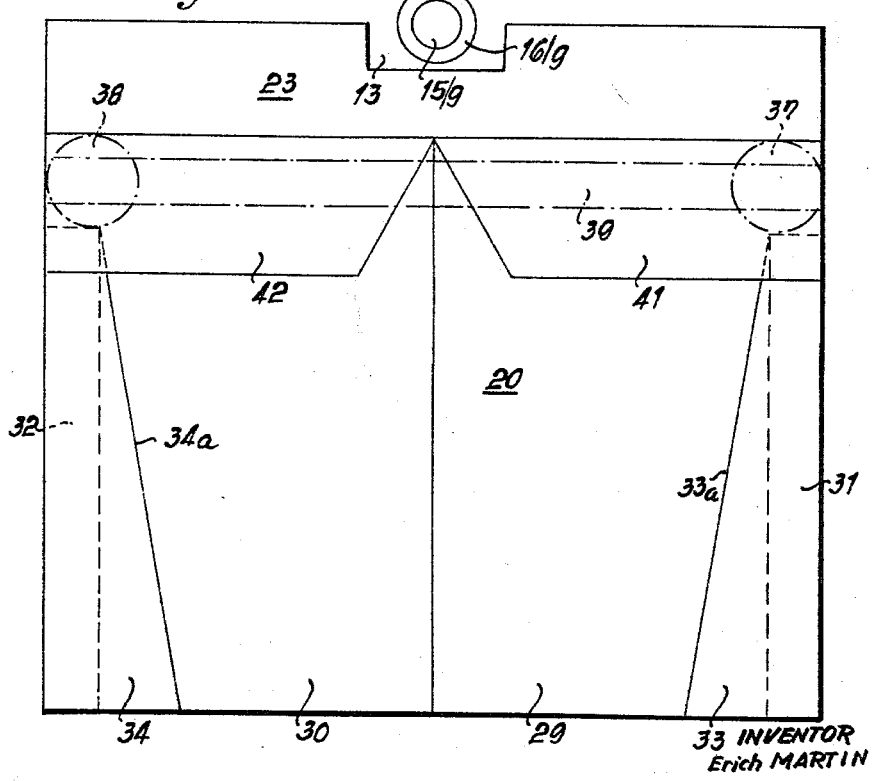
INVENTOR
Erich MARTIN

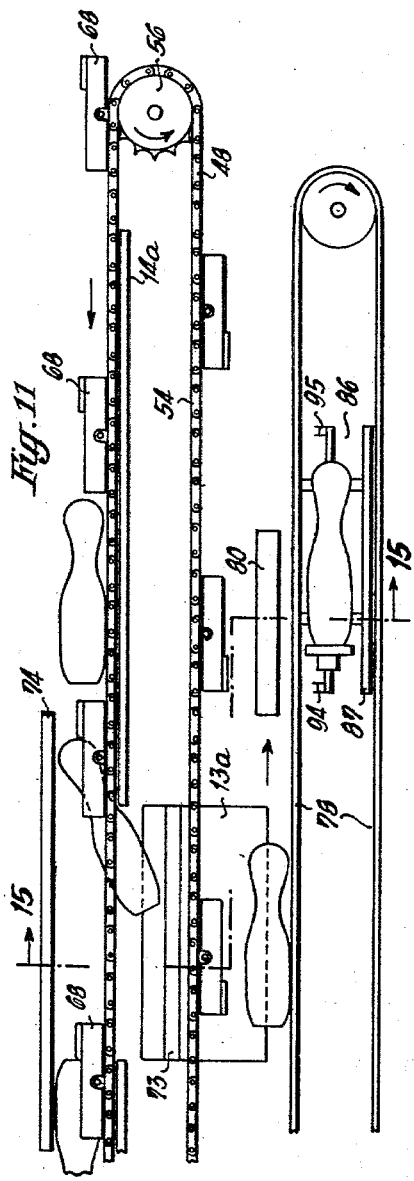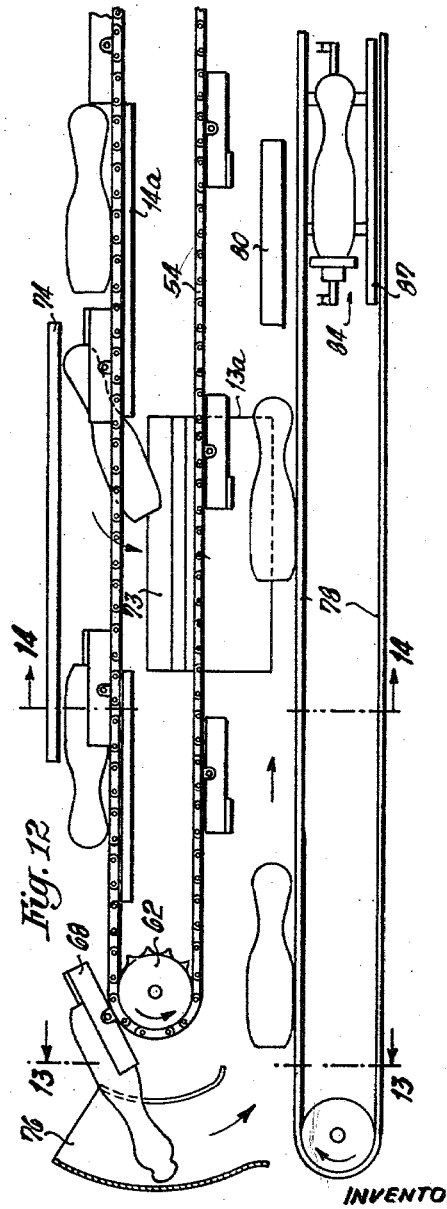

March 23, 1965  E. MARTIN  3,174,751
PIN SETTING MECHANISM WITH MEANS FOR SETTING
SELECTED PINS ON CORRELATED PIN SPOTS
Filed June 23, 1961  17 Sheets-Sheet 7
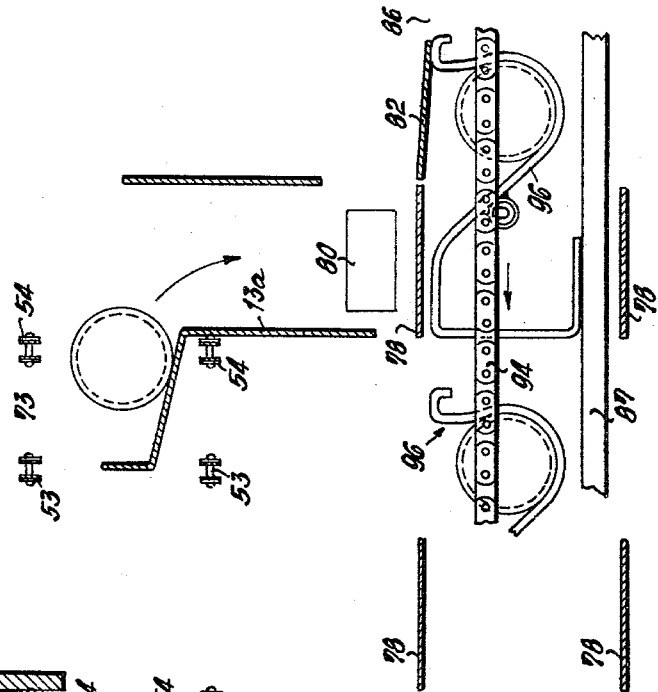
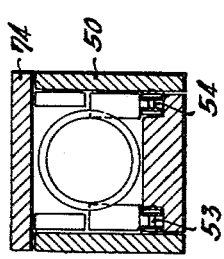
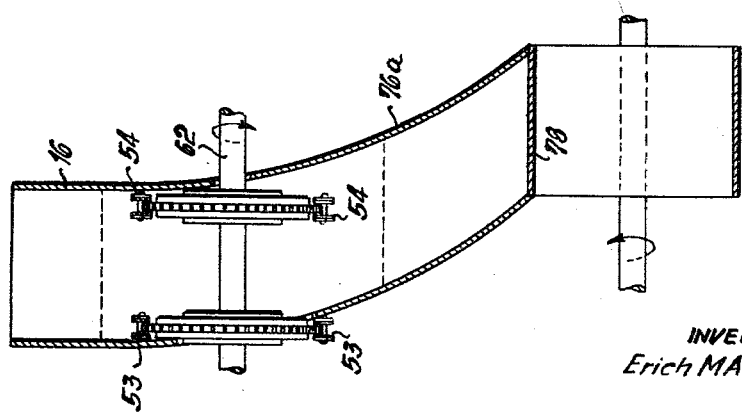
INVENTOR
Erich MARTIN

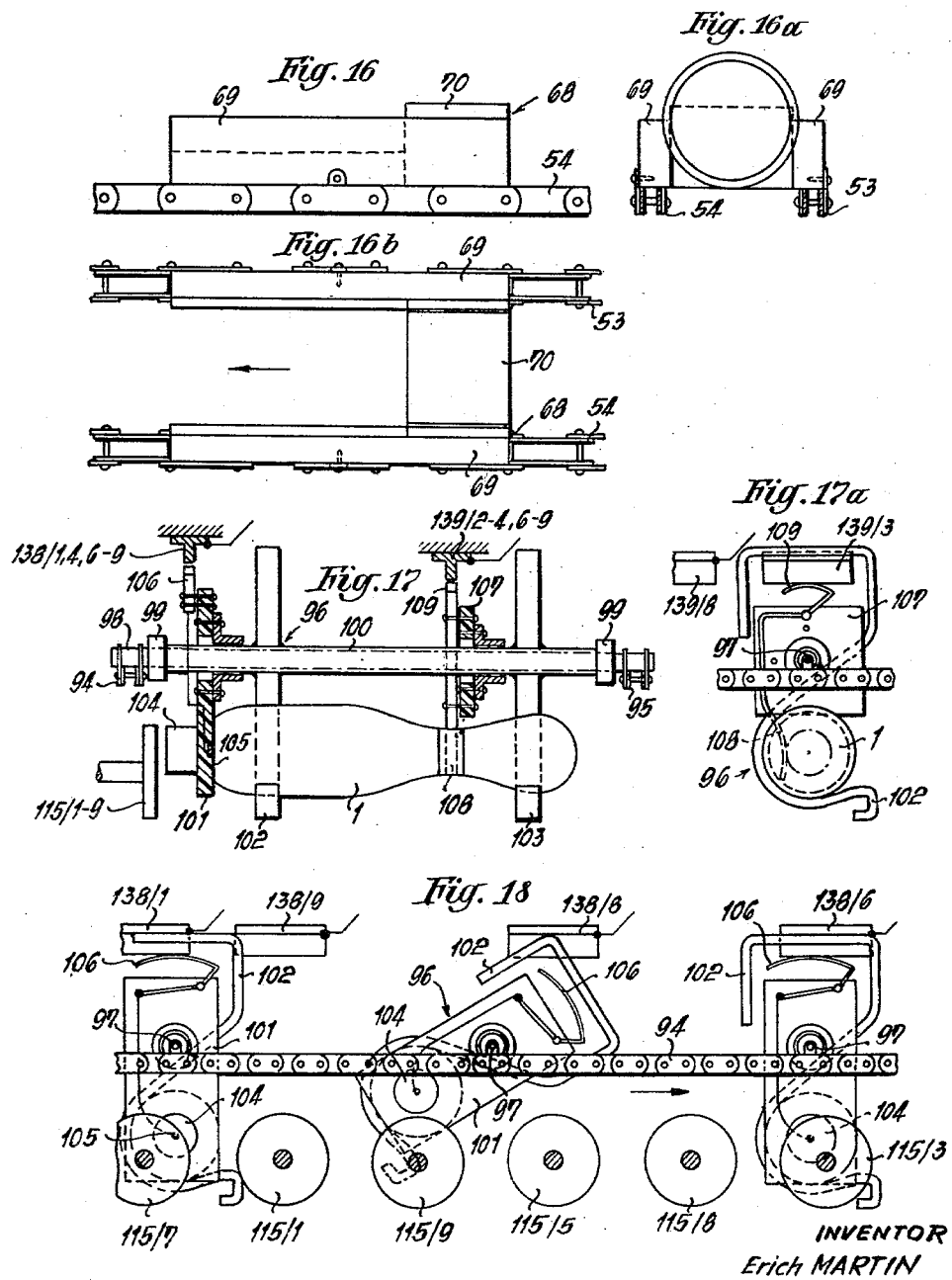

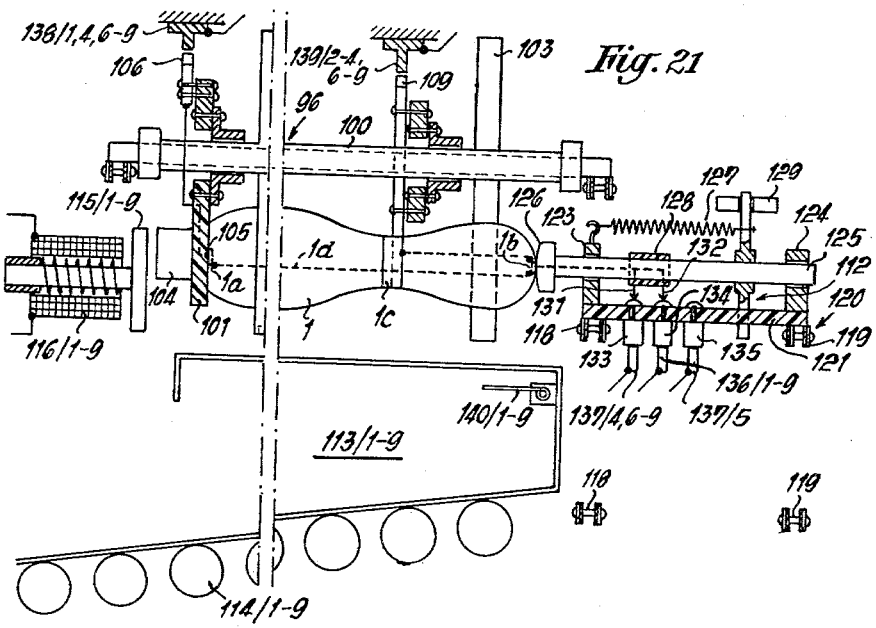
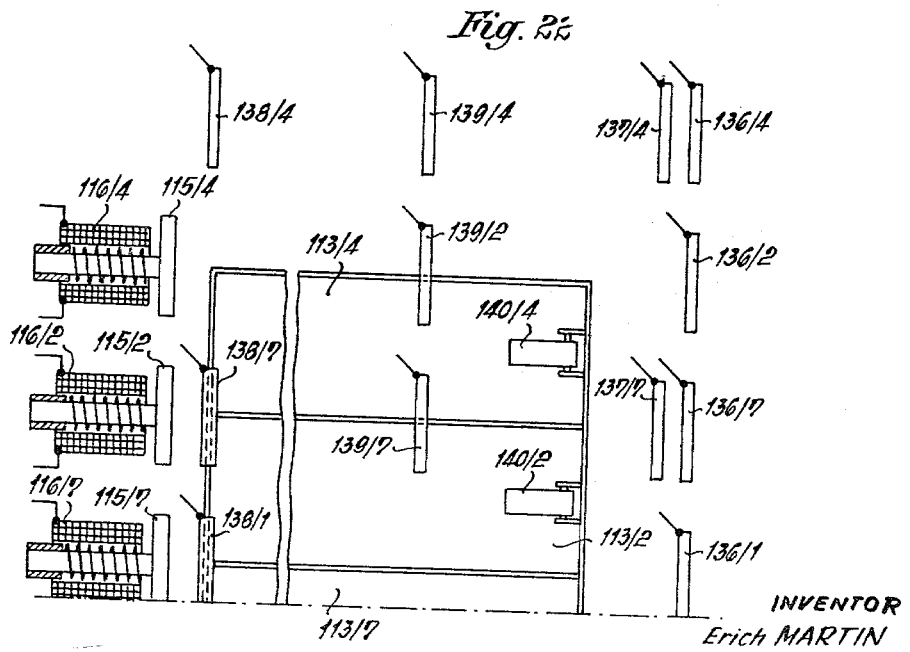

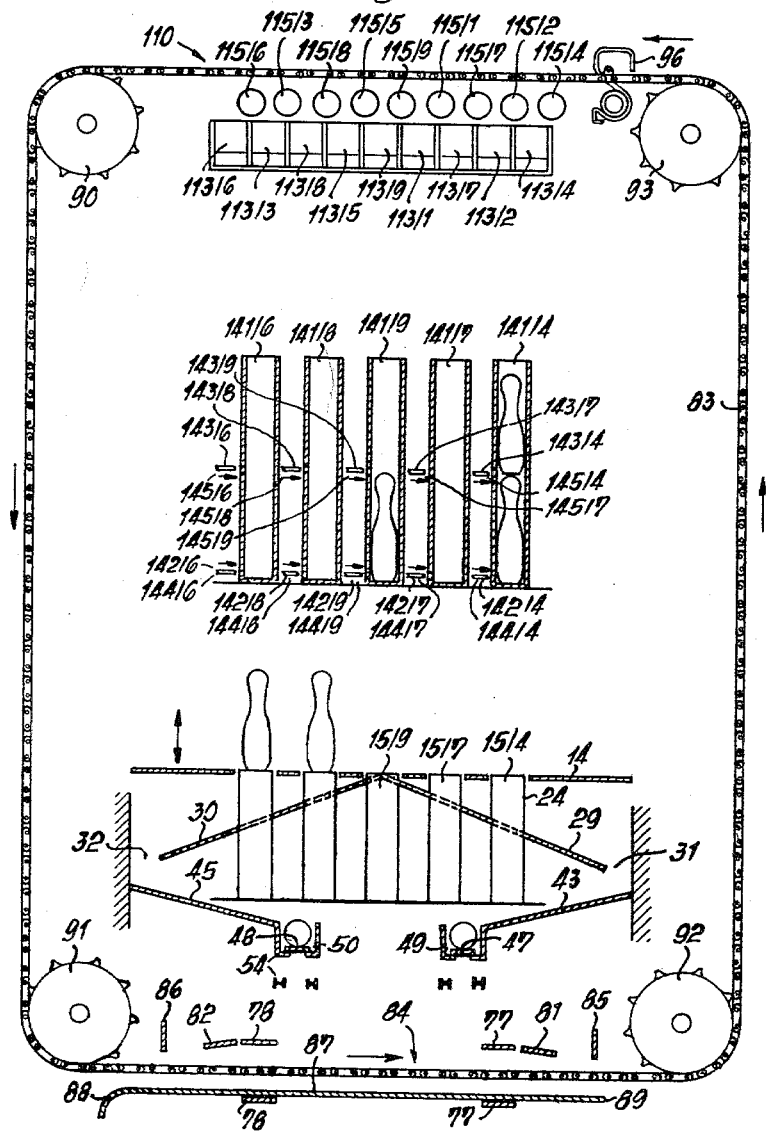

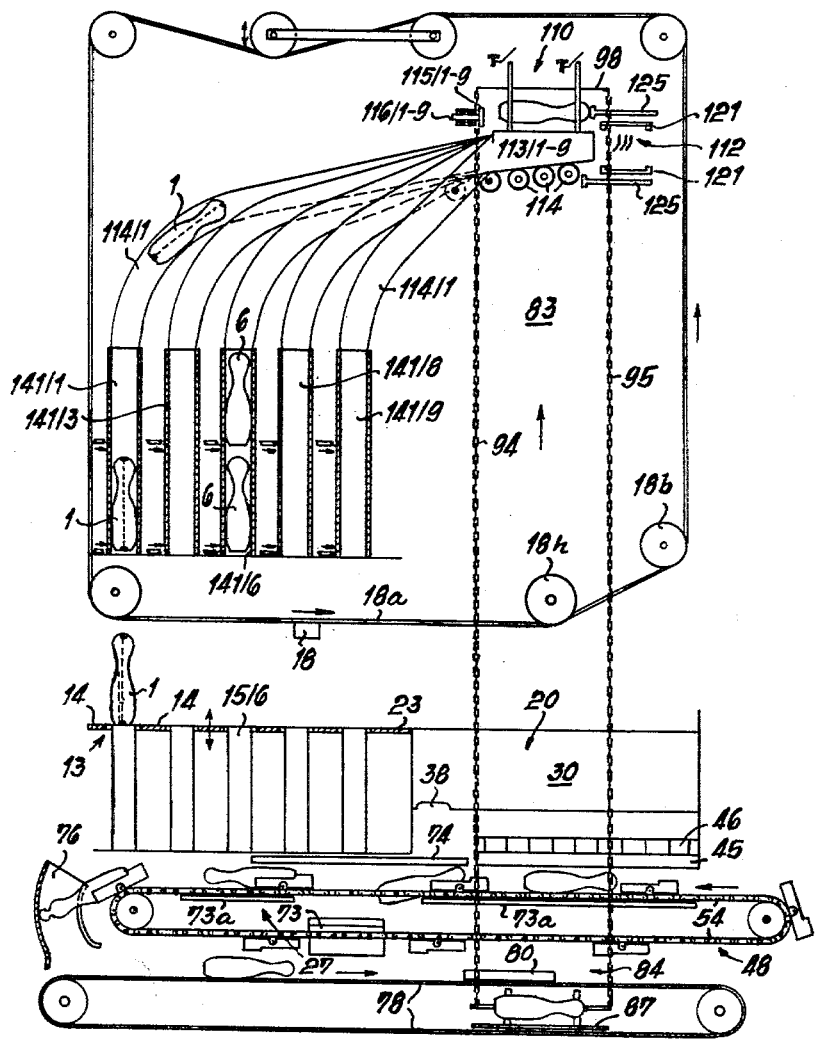

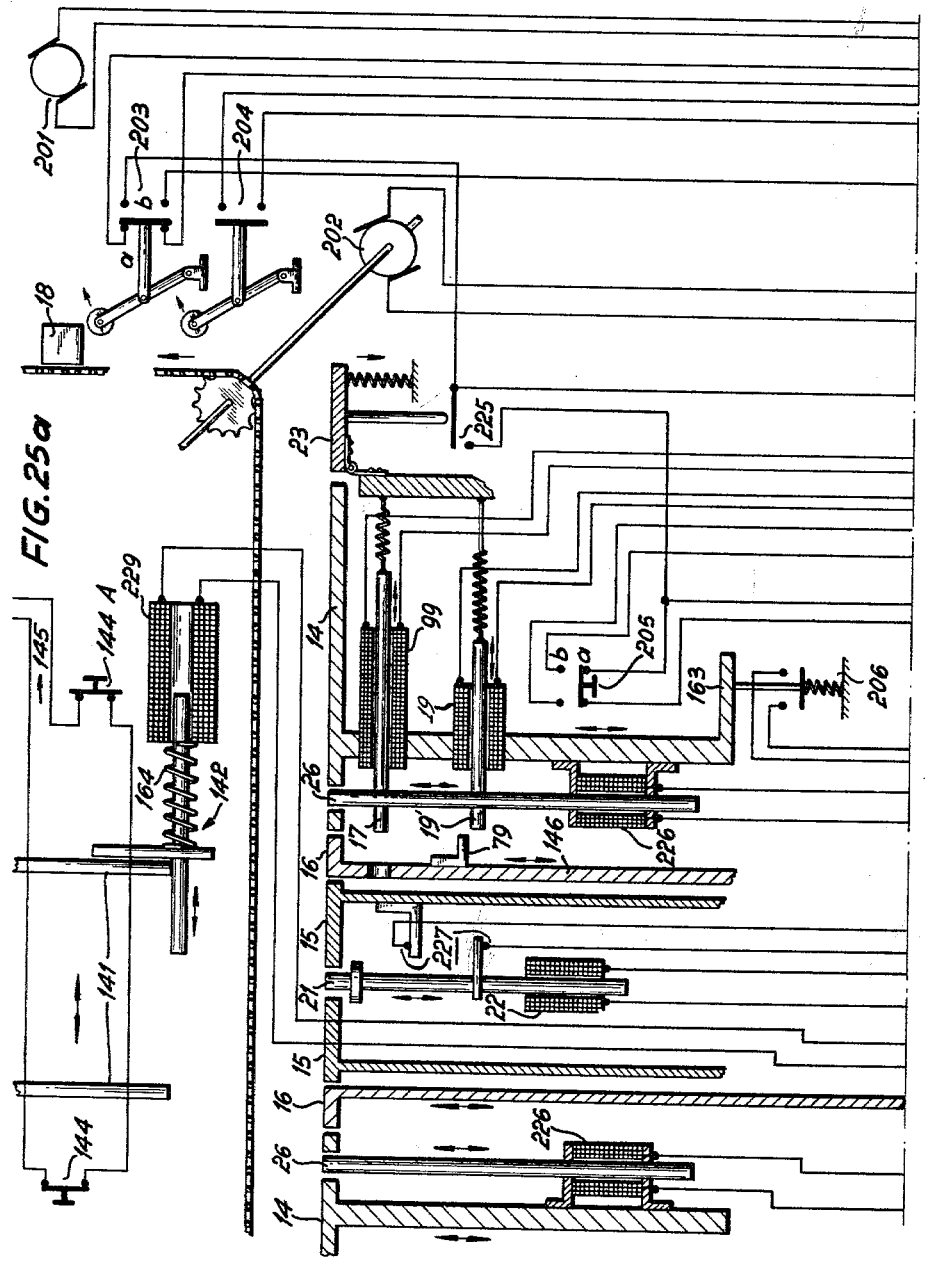

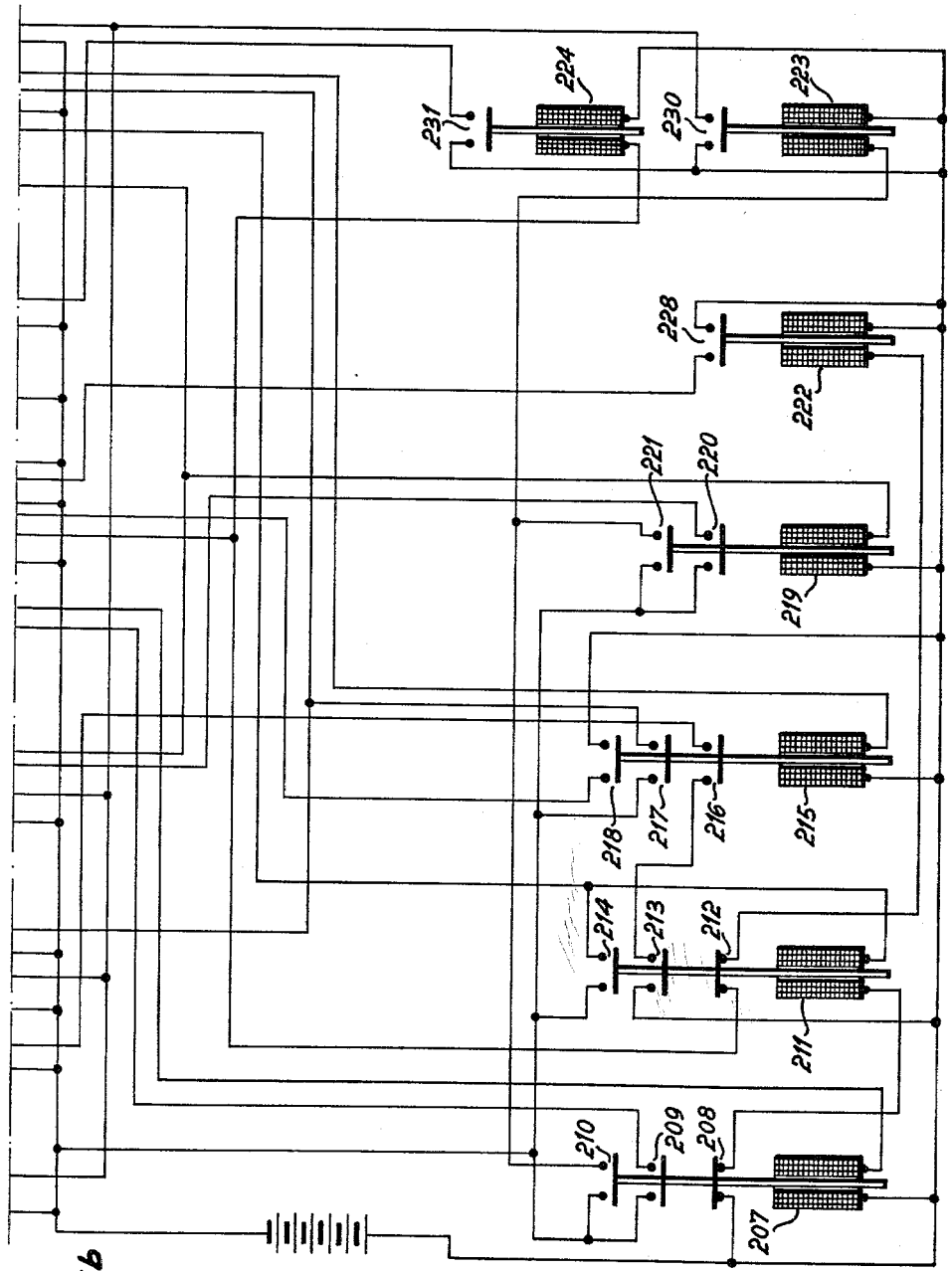

INVENTOR
ERICH MARTIN

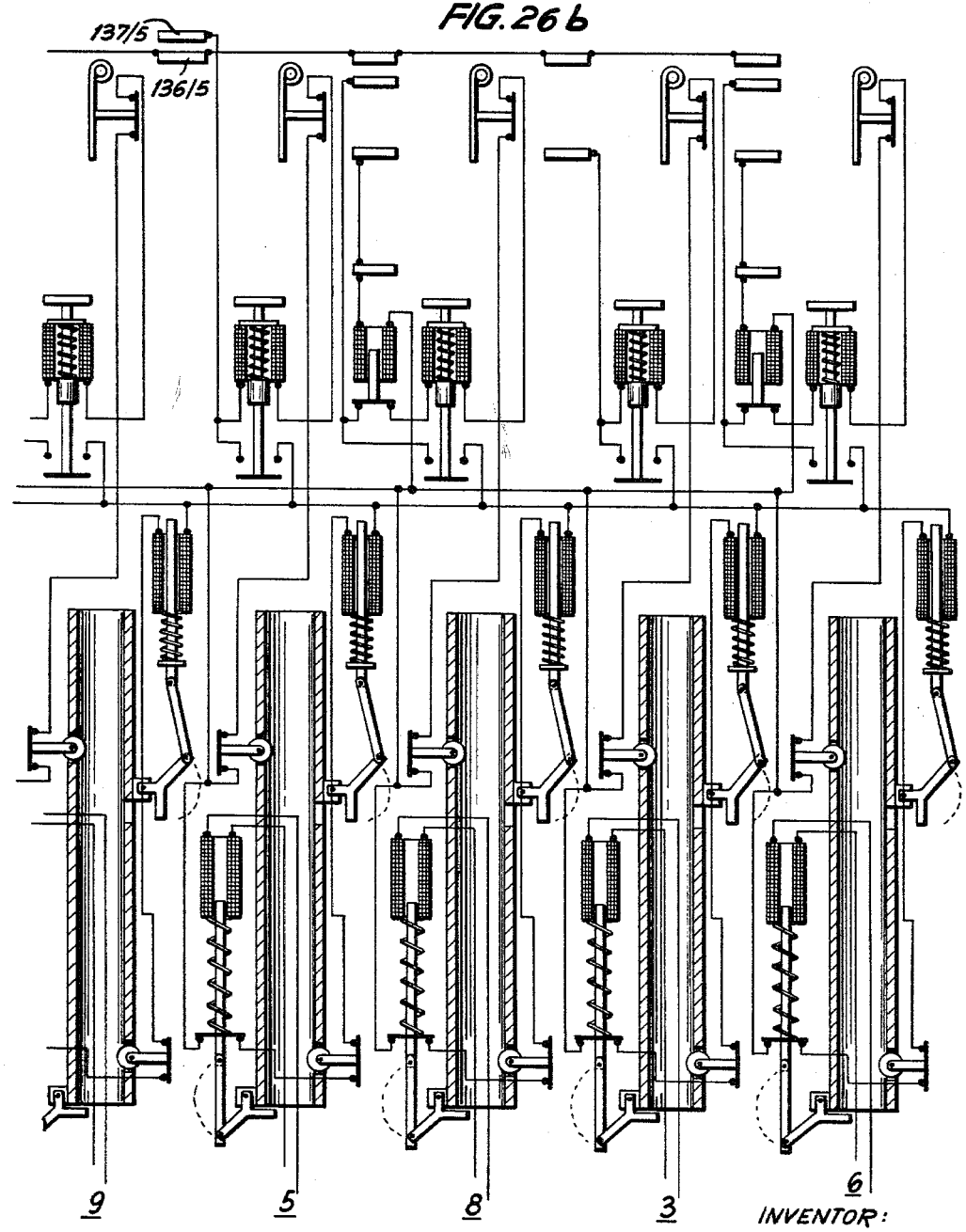

United States Patent Office 3,174,751
Patented Mar. 23, 1965

3,174,751
PIN SETTING MECHANISM WITH MEANS FOR SETTING SELECTED PINS ON CORRELATED PIN SPOTS
Erich Martin, Kirchenleite 4, Icking, Isartal, Germany
Filed June 23, 1961, Ser. No. 120,466
24 Claims. (Cl. 273—43)

The present invention relates to a pin setting apparatus, and more particularly to an apparatus for removing dropped pins, and for setting certain pins at associated places when other pins have been dropped and removed.

The game of bowling is played with nine pins in Europe, and with ten pins in the United States and other countries. Nine pins are always set up in a square, each side of which has three pins, a king pin being placed at the center of the square. Ten pins are arranged in a triangle, each side of which has four pins, and a pin at the center.

Automatic pin setters are known. An older construction uses ropes attached to pins and guided through holes in the bottom plate for setting dropped pins, while modern pin setters do not require any ropes, but pick up standing pins, remove dropped pins, and place a new set of pins when another set of pins has been dropped and removed.

The first mentioned type of pin setters has the disadvantage that the ropes interfere with the game, while the second type of pin setters required an iron core for the pins which increases the weight of the pins, but is necessary for picking up the pins by electromagnetic devices.

Even the most modern pin setting machine have the disadvantage that after a "spare" is scored, the pins which remain standing are picked up so that the dropped pins cans be swept off, whereupon the respective pins are set again. Due to the pick-up and replacing operations, the pin may not be set at exactly the same spot where it stood before, considering that the ball may cause a displacement of a pin, without dropping the same.

It is one object of the present invention to provide a pin setting apparatus which is free of this disadvantage, and removes dropped pins without performing any operation on pins which remain standing.

Particularly in the "nine pin" game, pins are of different shape, and the king pin is somewhat higher than the other pins. Furthermore, three pins of the set must be lighter than the other pins. It is necessary that the lighter pins are always set on the places with which they are associated, while standard pins are set on other places, and the king pin at the center. A more universal application of this principle may require that each pin is set on a certain place. Another object of the present invention is to provide a pin setting apparatus for setting selected pins, or all pins, on predetermined places.

A related object of the present invention is to provide a pin setting apparatus for setting pins of exactly the same shape on predetermined places respectively associated with the respective pins.

Another related object of the invention is to set a higher king pin at the center of the set.

Another object of the present invention is to provide a pin setting apparatus capable of removing dropped pins without disturbing pins which remain standing.

Another object of the present invention is to provide a pin setting apparatus which performs no operation on pins which are displaced by the ball, but remain standing.

Another object of the present invention is to provide a pin setting apparatus which sets new pins on exactly determined places without requiring any centering devices on the pins.

It is also an object of the present invention to provide a pin setting apparatus which obtains the above results by simple means, and in a very short time.

An additional object of the present invention is to provide a pin setting apparatus permitting the use of bowling balls of different diameter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1A and 1B are vertical sections of special pins provided with contacts according to the present invention, and FIGS. 1C, 1D and 1E are vertical sections of modified constructions of special pins;

FIG. 5 is a vertical elevation, partly in section on line 5—5 in FIG. 4, and illustrating the pin supporting structure with certain parts omitted for the sake of clarity;

FIG. 6 is a vertical sectional view showing on an enlarged scale a detail of FIG. 5;

FIG. 7 is a vertical sectional view showing on an enlarged scale another detail of FIG. 5;

FIG. 8 is a fragmentary plan view of the structure shown in FIG. 6;

FIG. 9 is a fragmentary plan view of the structure shown in FIG. 7;

FIG. 10 is a vertical sectional view taken on line 10—10 in FIG. 4, and illustrating the pit construction;

FIG. 10a is a plan view of the pit construction shown in FIG. 10;

FIG. 11 is the right portion, and FIG. 12 is the left portion of a side view illustrating apparatus for conveying pins out of the pit, and for inserting improperly positioned pins;

FIG. 13 is a cross-sectional view taken on line 13—13 in FIG. 12;

FIG. 14 is a cross-sectional view taken on line 14—14 in FIG. 12;

FIG. 15 is a cross-sectional view taken on line 15—15 in FIG. 11;

FIG. 16 is a side view, FIG. 16a is an end view, and FIG. 16b is a plan view of a pin holder used in the apparatus shown in FIGS. 11 and 12;

FIG. 17 is a front view, partially in section, and FIG. 17a is a side view illustrating a carriage for transporting pins on a conveyor and elevator;

FIG. 18 is a side view illustrating elevator carriages in different operational positions;

Figure 19:
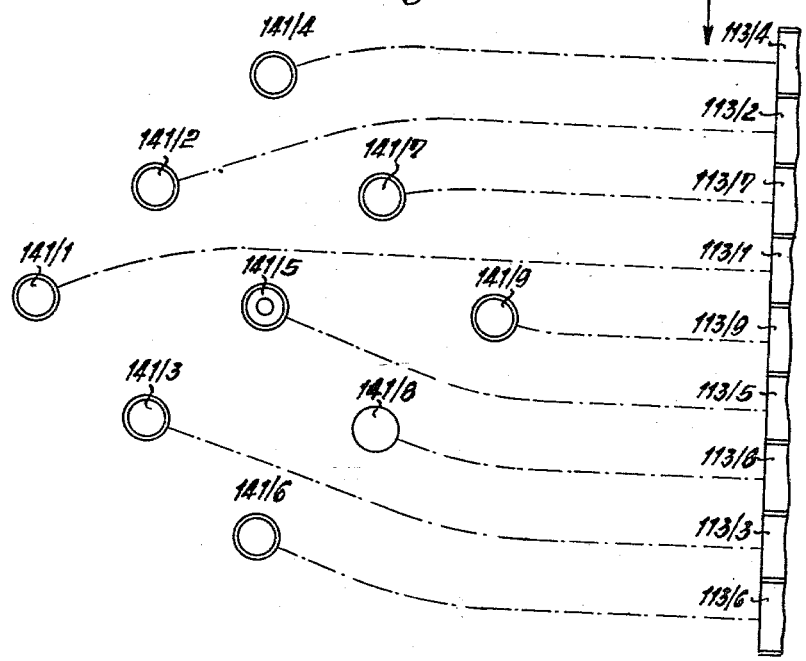
FIG. 19 is a schematic plan view illustrating the distribution of pins into associated magazines.
Figure 22A:
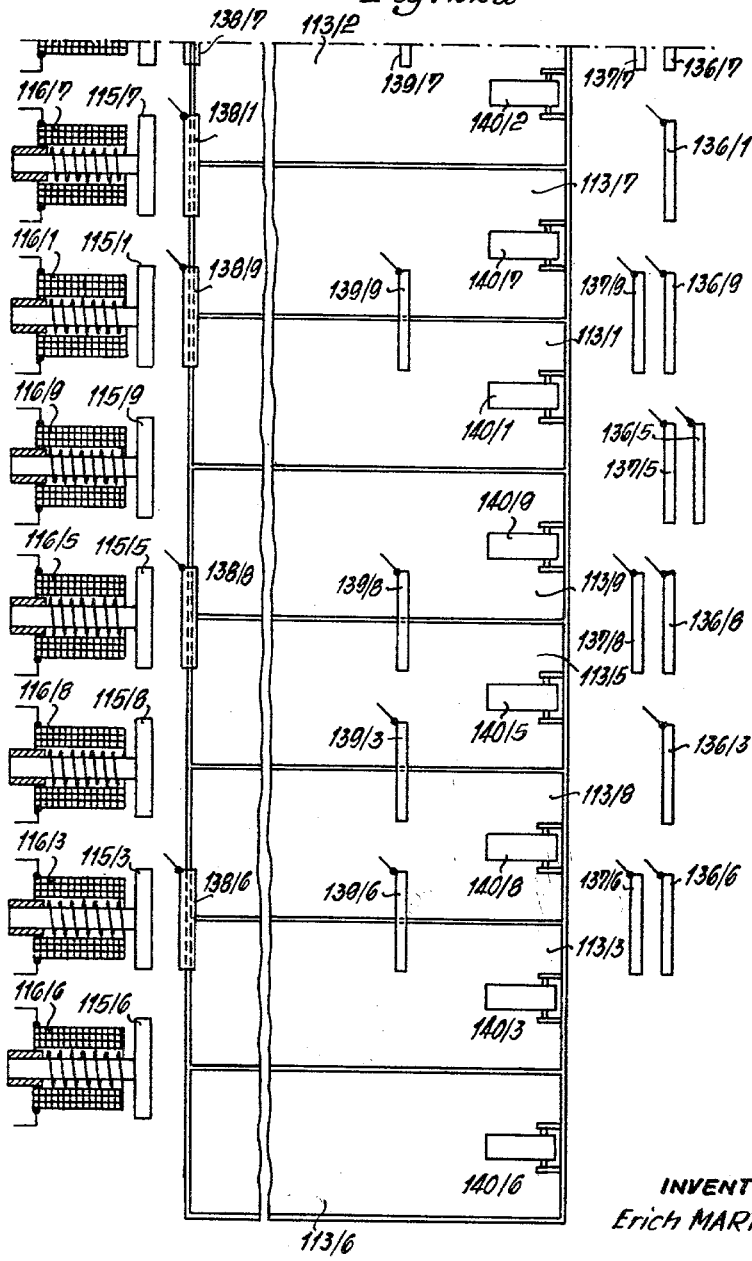

FG. 20 is a fragmentary schematic side view illustrating the arrangement of FIG. 19;

FIG. 21 is a fragmentary front view, partly in section, illustrating sensing means and a carriage of the type shown in FIG. 17 at an unloading station from which the pins are distributed to the magazines;

FIG. 22 is the upper portion, and FIG. 22a is the lower portion of a schematic plan view, partly in section, of the contact arrangement shown in FIG. 21 the carriage and sensing means being omitted for the sake of clarity;

FIG. 23 is a fragmentary vertical front elevation illustrating the pin setting apparatus of the invention;

FIG. 24 is a fragmentary schematic side elevation illustrating the pin setting apparatus;

FIGS. 25a and 25b are portions of a diagram showing a control circuit; and

Figure 26A:
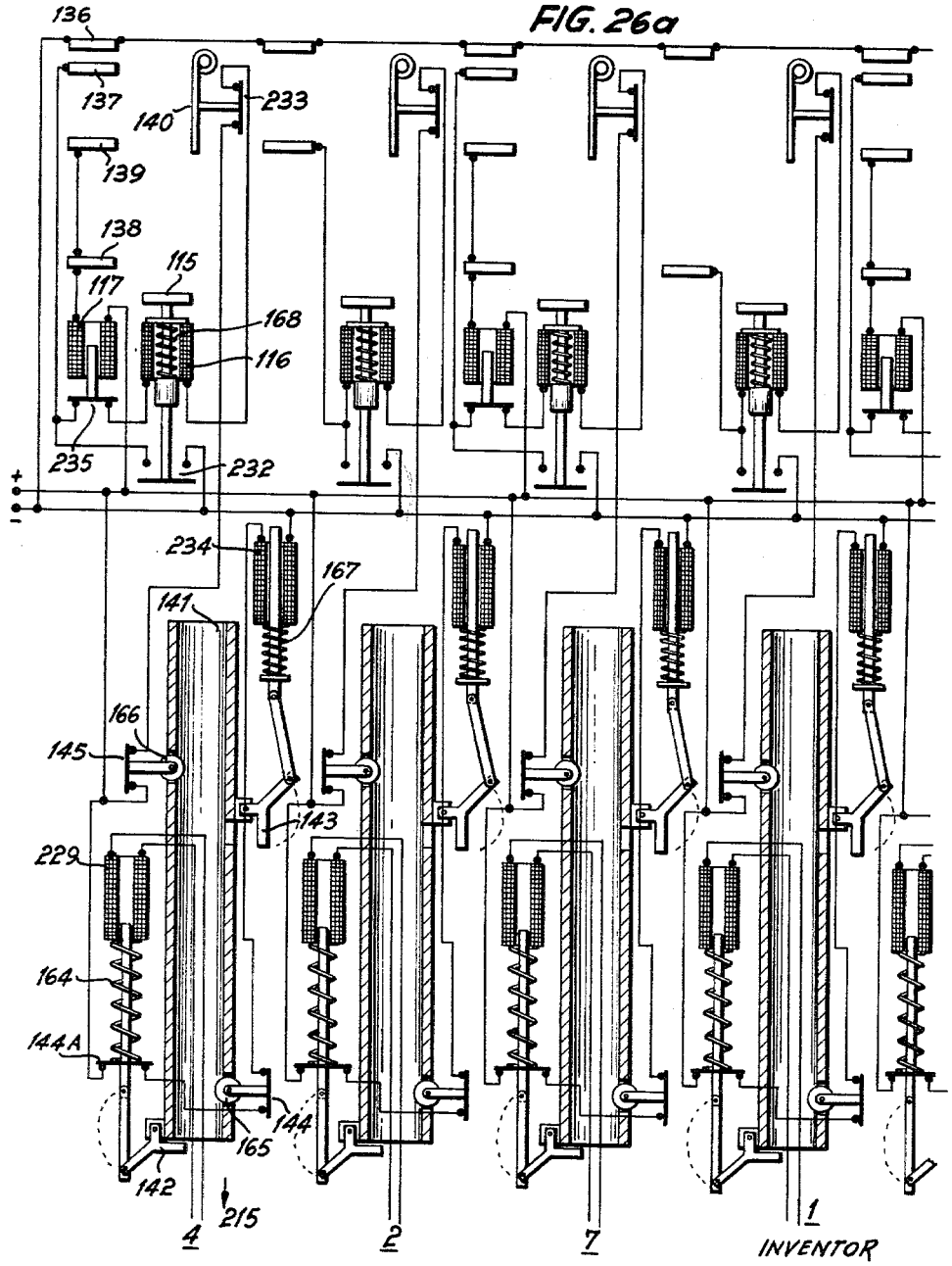

FIG. 26a and FIG. 26b the portions of a diagram illustrating the electric circuit for setting and distributing new pins.

The embodiment illustrated in the drawing relates to a pin setting apparatus for setting nine pins. The positions of the pins are indicated by the reference numerals 1 to 9 in FIG. 4, and all parts of the apparatus which are specifically associated with one of the pins, are designated by reference numerals having the pin number as a subscript.

Figure 2:
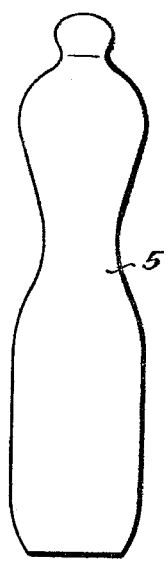
FIG. 2 is a side elevation of a higher king pin.
Figure 3:
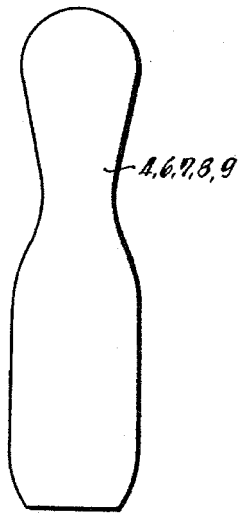
FIG. 3 is a side elevation of a regular pin.

In accordance with the rules of the "nine pin" game, pins 1, 2 and 3, shown in FIGS. 1A to 1E, are lighter than the standard pins 4, 6, 7, 8, 9, shown in FIG. 3, while the king pin 5, shown in FIG. 2 is higher than the other pins, and has a different shape. While pins 1, 2, 3 are lighter than pins 4 and 6 to 9, they have the same outer shape. The official rules of the German "Kegel" game distinguish between four types of pins: Front center pin 1, lateral front pins 2 and 3, king pin 5, and rear pins 4, 6, 7, 8, 9. Pins 1 and 5 must always be reset in the same positions, while the positions of pins 2 and 3 are interchangeable. The rear pins are also interchangeable with each other, but not with any other pin. The apparatus of the invention is designed to distinguish between the different types of pins, and to set them in accordance with the official rules of the game by a fully automatic operation.

Constructions of pin 1 are shown in FIGS. 1A, 1C and 1D. In the construction of FIG. 1A, a bottom contact 1a is connected by conductor 1d to a top contact 1b. In the modified construction of FIG. 1C, the bottom contact 1k is connected by conductor 1i to a capacitor 1m which is connected by conductor 1g to the top contact 1h. In the modification of FIG. 1D the bottom conact 1p is connected to an inductor coil 1q and by another conductor 1o to the top contact 1n.

As will be explained hereinafter in greater detail the top and bottom contacts are sensed and used for identifying pins 1 as is necessary for the proper setting of pin 1 on the assigned place.

FIG. 1B shows the contact arrangement for pins 2 and 3, which are interchangeable. A contact 1c extends around the neck of the pin, and the top contact 1f is connected by conductors 1e to the ring contact 1c. Pins 2 and 3 can also be constructed with capacitors and induction coils corresponding to the constructions of pin 1 shown in FIGS. 1C and 1D, but irrespective of the particular construction, pins 2 and 3 will have a ring contact and a top contact.

Contacts 1c and 1f are also sensed by the automatic apparatus of the invention, as will be explained hereinafter, and when pins 2 and 3 are recognized they are automatically set on the assigned places.

The contacts and conductors do not influence the shape or weight of the pins, and do not require any particular shape of the pin so that the pin setting apparatus is not dependent on the particular configuration of the pins. Instead of capacitors and induction coils, different resistors may be provided which permit a further distinguishing between a greater number of pins. As shown in FIG. 1E, bottom contact 1s is connected to top contact 1t by a conductor 1u and a resistor 1r. Also, direct current circuits and alternating current circuits may be used for distinguishing the pins, in which event some of the pins are provided with capacitors in their conductors, so that direct current cannot pass therethrough, while other pins are provided with inductances to bar alternating current. It is also contemplated to provide small oscillating circuits between the top and bottom contacts of the pins, and to distinguish the pins by the different reaction of the tuned oscillating circuits.

Figure 4:
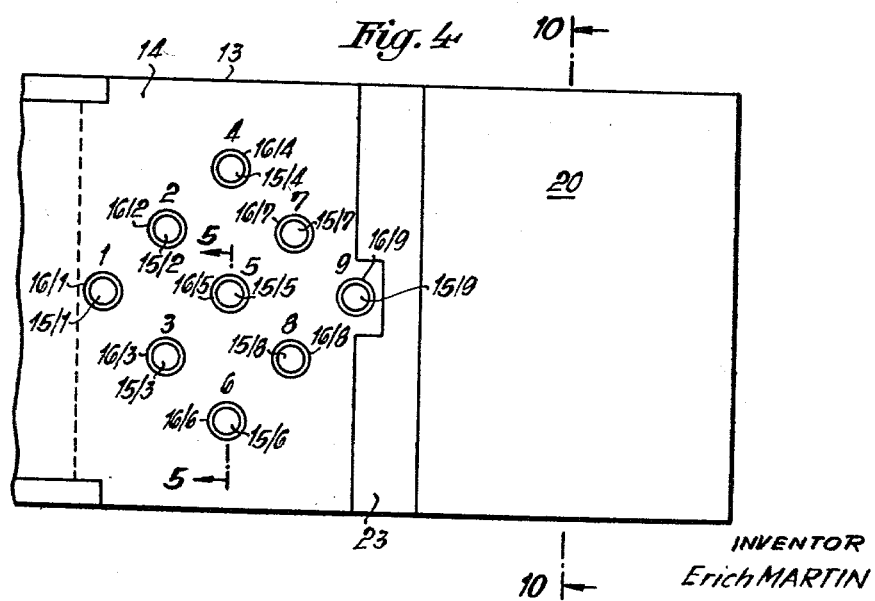
FIG. 4 is a fragmentary schematic plan view illustrating the plate on which the pins are set, and a pit for dropped pins.

As shown in FIG. 4, pins 1 to 9 stand on circular supports 15/1 to 15/9. The diameter of the supports 15 corresponds to the diameter of the pins 1 to 9, and is for example 101 mm. Supports 15 are surrounded by rings 16/1 to 16/9 which have an inner diameter of 101 mm. to match the supports 15, and an outer diameter of 161 mm.

When a ball is rolled from the left to the right in FIG. 4, it will drop some of the pins, and then depress a contact plate 23 before dropping into the pit 20. Contact plate 23 closes a switch by which certain functions are initiated. For example, a counter, not shown, may be set to respond to one, two, or three control impulses produced by this switch to start a pin resetting operation which will be described hereinafter. As shown in FIG. 5 for pins 5 and 8, and as best seen in FIGS. 6 and 8, each support 15 includes a circular top plate defining the place or area where the pin stands, and a downwardly extending tubular member 24 which can be secured to a lower support 25, shown in FIGS. 7 and 9 by a bayonet connection 24a, 24b. A feeler 21 passes through the top plate of each support 15, and is connected to the core of an electromagnet 22 which is mounted in tubular member 24, and has electric connections terminating in plugs 22a which are inserted into corresponding sockets 22b of members 25. Sockets 22b are connected by wires 22c into the circuit of the apparatus and upon actuation of the contact plate 23 by a ball, current is supplied to all electromagnets 22/1 to 22/9, and feelers 21 are urged to move upwardly into a position projecting from the top face of the respective support 15. However, the force of electromagnets 22 is selected so that feelers 21 cannot rise if a pin is standing on the top plate. Consequently, the rising feelers 21 indicate that no pin stands on the respective support, or in other words that the respective pin has been dropped by the ball. The circuit arrangement is such that the feelers are immediately withdrawn so as not to be subject to damage, but during the upward movement of any feeler, a contact 227 is closed which, through wires 22e, and plug 22f is connected to sockets 22g and wires 22h which lead to a control circuit by which other electromagnetic means are energized, as will be described hereinafter. It will be understood that feeler means 21/1 to 21/9 determine whether or not the respective associated pin was dropped, and produce a controlling impulse when the respective pin was dropped.

The bayonet connection between support 15, 24 and the lower support 25 permits removal of support 15, 24, and inspection and repair of the electric parts therein.

As best seen in FIG. 5, a platform in the form of a plate 14 is provided, plate 14 having nine circular openings 14' each of which has a diameter corresponding to the outer diameter of plates 16. When plate 14 is in a lower position indicated in broken lines in FIG. 5, the top surface of plate 14 is flush with the top surfaces of all rings 16, and of supports 15. Consequently, the ball can properly roll over such flush surface to drop pins. The switch of contact plate 23 connects a motor 201 into the circuit which, through a drive 14b raises plate 14 from the lower level shown in broken lines, to the higher level shown in solid lines in FIG. 5. In the higher position, plate 14 is located about 18 mm. above the top of the highest pin 5. It is evident that the rising plate 14 will raise fallen pins thereon to a higher level above the head of the pins, so that a sweeping bar 18, see FIG. 24, operated by suitable rope or chain drive 18a, 18b, can sweep over the top surface of the raised plate 14 and push all dropped pins into the pit 20, without touching the standing pins which remain at the lower level of the stationary support 15.

In the event that one or several of the feeler members 21 sense that the respective pin was dropped, its control impulse effects energizing of an electromagnet 19 of a set of electromagnets 19/1 to 19/9 which are mounted on the plate 14 and are located below the same. The armature of the respective electromagnet 19 will advance, as shown in FIG. 5 for the electromagnet 19/8, and will be located below a projecting bracket 19a on a tubular member 146/8 which is fixedly connected to the respective ring 16/8. Consequently, during rising of plate 14, tubular member 146/8 and ring 16/8 will also rise, and a top surface of ring 16/8 will remain flush with the top surface of plate 14. Consequently, the dropped pin 8 will be reliably raised by the rising members 14 and 16/1 to 16/9.

No control impulse will be produced by feelers 21 where the pin was not dropped, even if the pin was displaced by the ball to partly rest on the respective associated ring 16. Consequently, the respective electromagnet 19, for example electromagnet 19/5 in FIG. 5 will not be energized, and its armature will remain in the retracted position in which it can pass the respective bracket 19a so that the respective ring 16 remains in its lower position permitting a displaced pin to stand thereon. The openings 14' in plate 14 are wide enough to permit the raising of plate 14 without any interference with the pin which remains standing at the lower level, as shown for pin 5 in FIG. 5.

However, during the sweeping of the dropped pin from the raised plate 14, or even during the movement of plate 14, a dropped pin may fall into the wide opening 14' where a pin 5 is still standing, considering that the diameter of the respective opening 14' is not reduced by a risen ring 16.

A set of electromagnet means 99 is mounted on plate 14 below the same, and each electromagnetic means 99 has an armature with a blocking finger 17/1 to 17/9 which projects into the opening 14' when electromagnetic means 99 is energized. Such energization is effected when plate 14 has arrived in its higher position, and before the sweeping means 18 is operated. Since the blocking fingers close the wider openings 14, as well as the smaller openings of raised rings 16, no pin can drop onto a standing pin during the sweeping operation. Directly after sweeping, and the beginning of the lowering of plate 14, a switch is closed by the same which deenergizes electromagnet 99 and effects retraction of the blocking fingers so that the same do not interfere with standing pins, or with new pins dropped into tubes 146 from magazines, as will be described hereinafter.

For example, if the ball drops pins 1, 2, 4, and 7, before the upward movement of plate 14, rings 16/1, 2, 4, and 7 are connected by electromagnetic means 19/1, 2, 4, 7 with plate 14 so that rings 16/1, 2, 4, 7 move upwardly with plate 14, while the rings 16/3, 5, 6, 8, 9 remain in the lower position. Pins 3, 5, 6, 8, 9 remain on their initial place without being touched or operated. Assuming that the dropped pins 2 and 4 were thrown into the pit 20, while pins 1 and 7 remain lying on plate 14, it would be possible for the dropped pins 1 and 7 to roll against the standing pins while the plate 14 rises from its lower position to its upper position. This is prevented by protecting pins 26, see FIGS. 6 and 7 which are placed about each ring 16 and are normally in the lower position shown in FIG. 6 in which their top faces are flush with support 15 and plate 14. Before the motor 201 is energized to raise plate 14, electromagnetic means, not shown, and under control of contact plate 23, raise all protecting members 26 above the top surface of plate 14 so that the dropped pins do not roll against the standing pins during the rising of plate 14. In the higher position of plate 14, the protecting members 26 are withdrawn, and as explained above, the sweeping member 18 passes over the raised plate 14, the raised rings 16 and the openings in the same to remove the dropped pins 1 and 7.

Directly after the passage of the sweeping member 18, the respective blocking fingers 17 are withdrawn by electromagnetic means 99, and plate 14 is lowered. In the lower position of plate 14, pins 3, 5, 6, 8, 9 are ready for the next rolling of a ball, and it may be assumed that now pins 3 and 6 drop, and that the dropping pin 3 displaces pin 5 about one inch from its upper place so that only pins 8 and 9 remain in their initial positions, and pin 5 partly rests on the associated ring 16/5.

Before the plate 14 is raised, rings 16/1, 2, 3, 4, 6 and 7 are connected by electromagnetic means 19/1, 2, 3, 4, 6 and 7 with plate 14, and protecting members 26 are moved to the operative position, whereupon plate 14 moves upward, and the blocking fingers 17/1 to 17/9 are advanced by electromagnetic means 99. The protecting members 26 are withdrawn, the sweeping member 18 is operated, the blocking fingers 17/1 to 17/9 are withdrawn, and plate 14 is lowered so that pins 5, 8 and 9 are ready for the next ball, pin 5 being still in its slightly displaced position resting on ring 16/5. In this game, a third ball drops all remaining pins 5, 8 and 9, and when the ball engages contact plate 23, motor 201 raises plate 14 with the dropped three pins which are swept into the pit 20, as explained above. Since the sensing means 21 sense no pins on support 15, all contacts 227 are closed, and the control circuit prevents the actuation of the electromagnetic means 99, and causes the actuation of the sweeping member 18. A control impulse effects dropping of nine pins 1 to 9 from the magazines 141/1 to 141/9, see FIGS. 23 and 24, which drop into the tubular members 146/1 to 146/9. The control impulse may be automatically given when the ball one, twice, or three times actuates contact plate 23, or when no sensing means 21 senses a standing pin. A manually operated switch may also be used for this purpose. Spring loaded guide means 148/1 to 148/9 have projections 147/1 to 147/9 which slidingly engage the respective dropping pin and place the same in an exactly determined position, as shown on the right side of FIG. 5.

Guide means 148 have rolls which project into corresponding grooves in plates 15 and cooperate with the bottom part of the pin.

In the above described operation, the control circuit was set to supply a set of new pins after all pins were dropped. It is possible to provide different relay arrangements which can be set by a manually operated control member to different rules of the game. In this manner, the control circuit can be set to replace all dropped pins after a spare has been scored, and any desired operation can be obtained by suitably connecting the feeler contacts 22d into the circuit.

Pins which are swept, or which drop into the pit 20, best seen in FIGS. 10 and 10a, are seperated from balls, and at the same time are oriented so that their axes extend in the direction of the alley.

A roof-shaped structure 28 including two inclined surfaces 29 and 30 is located in the pit. The lower edges are preferably located 350 mm. below the top edge of structure 28, and spaced 120 mm. from the lateral walls of the pit, forming with the same gaps 31 and 32. These gaps are shielded by projecting skirts 33 and 34 so that neither pins nor balls can directly drop into gaps 31. The lower edges of members 33 and 34 form gaps 35 and 36 with the downwardly inclined surface 29 and 30, and the width of these gaps is selected to permit the passing of pins, but to prevent the passing of balls which will roll along the inclined edges 33a and 34a on the inclined surfaces 29 and 30 until they arrive at openings 37 and 38 through which they drop into a downwardly inclined channel 39 in which the balls roll to a conveyor, not shown, by which they are returned.

Openings 37, 38 are covered by a projecting horizontal wall including parts 41 and 42 so that pins cannot drop into the same. A pair of downwardly inclined members 43 and 45 are located below gaps 31 and 32 and lead to a pair of channels 49 and 50 which extend in the direction of the alley in the pit. Members 43 and 45 have grills 44 and 46 consisting of rods of about 200 mm. length which extend in the direction of the fall lines of the inclined members 43 and 45 spaced 100 mm. from each other. Pins rolling on these rods are oriented to extend parallel to the channels 49 and 50, particularly if they have a substantially cylindrical shape. In certain games, bulging pins are used, in which event conveyor bands running upwardly in the plane of surfaces 29 and 30 are advantageously added to orientate the downwardly rolling pins. Corresponding downwardly running conveyor bands can be provided on members 43 and 45 to aid in the orientation of the pins.

In some games, small balls are used, which also pass through gaps 35 and 36, but drop between the rods of grids 44 and 46.

Pins in channels 49 and 50 either point toward the alley or in opposite direction. Since in the magazines 141, FIGS. 23 and 24, all pins must have their heads on top, those pins which have their heads pointing towards the alley, must be turned through 180° about a transverse axis which is carried out at a reversing station 27 located below the pin stand 13 and the pit 20, see FIG. 24.

Endless bands 47 and 48 run in the channels 49 and 50, each band having a series of holders 68, best seen in FIGS. 11, 12, 16, 16a, 16b, and 14. Each holder includes a block 70 to which two lateral plates 69 are secured at a distance corresponding to the heads of the pins 1 to 9, the inner surfaces of plate 69 having recesses for receiving the thicker lower parts of the pin. Pins dropping on a band 47, 48 are engaged by the holders 68, but while pins whose lower parts are first engaged by the holders are supported by the same, pins whose heads are first engaged by the holders are not supported, but pushed along plates 74a until they arrive over openings 73 between successive plates 74a through which the non-supported pins drop, while pins supported by holders 68 are carried by the same over the opening 73 as best seen in FIGS. 11 and 12. Plates 74 are located above holders 68 in the region of the opening 73, so that the pins cannot directly drop through the opening 73, but must fall on those portions of the bands 47 and 48 where plates 74a are provided so that they are picked up by holders 68.

Near the reversing and drive wheel 62 of the chains 53 and 54 of bands 47 and 48, where the reversing and drive wheels 62 are provided, a reversing member 76 is located. The other ends of chains 53 and 54 pass over a wheel 56 so that the chains form endless loops.

Those pins whose lower thicker portions are supported on holders 68, point with their heads toward the reversing member 76, and pass along the same to be reversed before dropping on a conveyor band 78 on which pins, which dropped through opening 73, are also located. All pins on conveyor band 78 point in the same direction.

As best seen in FIGS. 13 to 15, conveyor band 78 is laterally displaced with respect to band 49. Consequently, reversing member 76 has a transverse chute 76a, see FIG. 13, and deflecting members 73a are located below and adjacent the openings 73, see FIG. 15, so that all pins are properly placed on the conveyor 78. Conveyor 78 carries all pins properly oriented with the heads pointing in the same direction to a loading station 84 where they are loaded on an elevator 83 to be carried to a distributing station 110, see FIGS. 23 and 24. A second conveyor 77 cooperates with band 47 in the same manner as conveyor 78 cooperates with band 48.

A guide member 80 cooperates with band 78, and a corresponding member, not shown, cooperates with band 77, and the guide members having oblique guide faces for pushing the pins off the conveyor bands 77 and 78 and onto inclined surfaces 81 and 82 where the pins roll to the loading places 85 and 86 in the loading station 84 of the elevator 83.

Elevator 83 comprises a pair of chains 94 and 95 guided over four wheels 90 to 93 of which wheel 90 is driven. The elevator 83 has a horizontal portion passing below the pit 20 and through the loading station 84, and a vertical part leading over wheel 93 to the distributing station 110. The chains 94 and 95 have brackets 97, which are spaced about 350 mm. each chain, and transporting shafts 98 which are about 650 mm. long corresponding to the spacing of the chains.

Carriages 96 for the pins include hollow shafts 100 turnable on shafts 98, an abutment plate 101, and two pin carriers 102 and 103 which are substantially Z-shaped, and having aligned recessed portions for receiving pins 1 to 9. As best seen in FIG. 15, pins rolling over the guide plate 82 will drop into the corresponding recess formed by carriers 102, 103, but cannot drop into the space between two carriages 96 since the same are too closely spaced. To receive the pins, carriages 96 must be in the position of FIG. 15, which is accomplished by a cam portion 88 which turns carriages 96 into the proper position when the same have passed over wheel 91 and move onto the horizontal portion of the chains of the elevator at the loading station 84. The plate 87 holds the carriages 96 in this position until they pass beyond the end 89 of plate 87 where the carriages again assume the position shown in FIG. 17a, having turned through 90°.

The abutment plates 101 of carriages 96 have contact 105 which engage the bottom contacts 1a of pins 1 carried by carriers 102 and 103. The pin shown in FIG. 21 is a composite of the pins FIGURES 1A, 1B, 2 and 3 which have different contact arrangements as explained with reference to FIGS. 1A and 1B. The insulating plates 101 have conductors connecting contacts 105 with slide contacts 106 which cooperate with stationary contacts 138/1, 4, 6, 7, 8, 9 as best seen in FIGS. 21 and 22.

The carriages 96 further include insulating plates 107 having contact springs 108 and slide contacts 109 connected to contact springs 108. Contact springs 108 engage the annular contacts 1c of pins 2 and 3 when such pins are transported by the carriages 96. The slide contacts 109 cooperate with stationary contacts 139/2, 3, 4, 6, 7, 9, see FIGS. 21 and 22.

Figure 20:
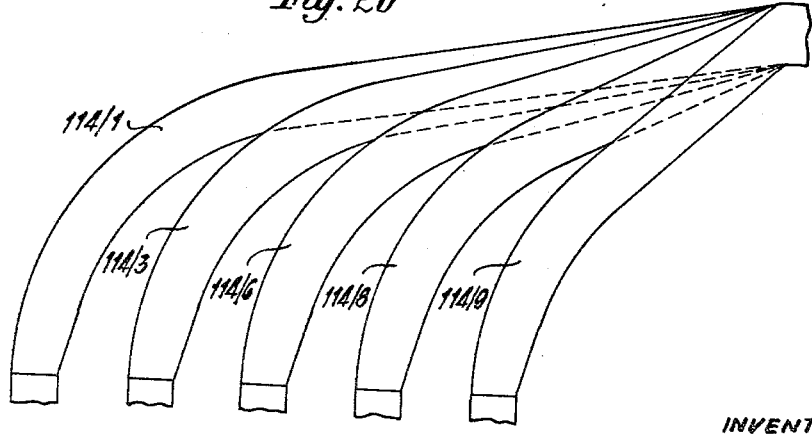

The abutment and feeler plates 101 have projections 104 which have a diameter of 50 mm. and a length of 35 mm., and cooperate with rollers 115/1 to 9 which are mounted on the armatures of electromagnetic means 116/1 to 9 which are arranged in a particular order as best seen in FIG. 22. When an electromagnetic means 116 is energized, roller 115 is shifted to a position cooperating with projection 104, and effects turning of the respective carriage 96, as shown in FIG. 18. Since in the position of the carriage 96 shown in the center of FIG. 18, the recess in which the pin is supported faces downward, the pin drops out of the respective carriage 96 to drop in a corresponding catch hopper 113 from which roller guides lead to a set of magazines 141/1 to 141/9, which are arranged directly above and aligned with the support plates 15/1 to 15/9. The roller guides 114/1 to 114/9 are schematically shown in FIGS. 19, 20 and 24, and schematically shown in FIG. 21. Due to this arrangement, a pin released over a catch hopper 113/1 to 113/9 at the distributing station 110, will be placed in a corresponding magazine 141 in a position ready to drop onto its assigned place at the pin station 13. Consequently, it is necessary that electromagnetic means 116 is energized to operate roller 115 when a carriage 96 carrying the respective pin passes over the respective associated catch hopper 13.

Sensing means are provided for recognizing the pins when the same pass over hoppers 113 at the distributing station 110.

From the above description it becomes apparent that at the distributing station 110, nine sub-stations are provided, each sub-station including members 116, 115, a hopper 113 with an indicator 140, and certain contacts 136, 137, 138 and 139. The indicators 140/1 to 140/9 include switches closing a circuit and effecting the retraction of the rollers 115/1 to 115/9 when a pin is located in the respective hopper 113/1 to 113/9. In the circuit of electromagnetic means 116/4, 6, 7, 8, 9, five blocking relays 117/4, 6, 7, 8, 9 are located.

The sensing means for recognizing the respective pins includes a sensing band 112 which cooperates with the control contacts 136/1 to 9, 137/4 to 9, 138/1, 4, 6, 7, 8, 9 and 139/2, 3, 4, 6, 7, 8, 9. The sensing band 112 comprises two endless chains 118 and 119, and about 20 to 25 sensing devices mounted on the chains 118 and 119 and being spaced along the same the same distances as carriages 96 so that at the distributing station 110, a carriage 96 and a sensing device 120 travel parallel to each other in a horizontal direction.

A sensing device 120 includes a base 121 consisting of an insulating material which is secured to brackets 122 of chains 118 and 119. Guide members 123 and 124 are mounted on base 121 and support sensing feelers 125 for transverse movement toward the respective carriage 96 of elevator 83. A spring 127 urges sensing feeler 125 to the left as viewed in FIG. 21 so that the heads 126 of feelers abut a pin carried by the corresponding carriage 96. Each member 125 has an arm engaged by spring 127 and provided with a roller 129 cooperating with a cam, not shown, by which member 125 can be shifted to the right as viewed in FIG. 21 and away from the respective pin carriage 96.

Each feeler member 125 can assume three positions. In the first postion, projection 128 which is a contact, abuts the guide member 123, in the second position, projection 128 is in the position shown in FIG. 21, and in the third position, head 126 abuts the guide member 123.

The first position is assumed by member 125 under the action of spring 127, and indicates that there is no pin transported by the respective carriage 96. The second position indicates the presence of a pin 1 to 4 or 6 to 9 in the respective carriage, and the third position indicates that a longer pin 5 is transported by the respective carriage 96. The three positions of the sensing member 125 control the energizing of electromagnetic means 116, and consequently the dropping of the respective pin from a carriage 96 into a suitable hopper 113.

When the head 126 of a member 125 abuts a pin, it also urges the pin against the abutment plate 101, and more particularly against a contact 105 which engages the bottom contact 1a of a pin 1, or the head contact of a pin 2 or 3.

Control contacts 136/1 to 9 and 137/4 to 9 are located between the chains 118 and 119, contacts 136 being arranged in a row, contacts 137/4 to 9 being located on the left side of contacts 136, and contacts 137/5 being located on the right side of contacts 136. These contacts are engaged by contacts 133, 134, 135 on the insulating plate 121 of the sensing device during movement of band 120, contacts 133 and 134 being connected to the head 126 to establish an electrical connection with the head contact 1b of the pin 1 to 3. If member 125 is shifted to the right by long pin 5, then contact 134 engages contact 137/5.

Slide contacts 109 slide over contacts 139/2 to 4, 6 to 9 and slide contacts 106 slide over contacts 138/1, 4, 6 to 9.

Directly vertically aligned with the support plates 15/1 to 9 are the nine pin magazines 141/1 to 9. The lower ends of magazines 141 are closed by electromagnetically controlled locking member 142/1 to 9, and at half the height of the magazines 141, other electromagnetically operated locking members 143/1 to 9 are provided. Pin indicators 144/1 to 9 cooperate with the lower locking members 142, and pin indicators 145/1 to 9 cooperate with the higher locking members 143.

The above described distributing and setting arrangement operates in the following manner: Assuming that a pin 1 has been loaded at the loading station 84 on a carriage 96, and is transported by the same through the distributing station 110, the head of pin 1 is engaged by the head 126 of a feeler 125 of the corresponding feeler device 112 which travels at the same speed beside carriage 96 through the distributing station 110. The pin 1 passes over the sub-stations associated with the pins 4, 2, and 7, and would be dropped at sub-station 4 since it had been the same shape as a standard pin 4, 6 to 9. However, the locking relay 117/4 is energized and interrupts the circuit of the electromagnetic means 116/4. Locking relay 117/4 is energized by current passing through contact 136/4, slide contact 134, contact 132 on feeler 125, a contact in the head 126, the contacts 1a and 1b, and the conductor 1d of pin 1, the contact 105 on the abutment plate 101, the slide contact 106, and the control contact 138/4. The roller 115/2 is also passed by pin 1 without actuation, since only pins 2 and 3 close the necessary circuit for operation of electromagnetic means 116/2.

When the carriage 96 with pin 1 passes hopper 113/7, a similar circuit is formed as described with reference to the locking relay 117/4 so that the locking relay 117/7 interrupts the current of the electromagnetic means 116/7, and the pin 1 is not dropped.

When the carriage 96 with pin 1 reaches the control contacts 136/1 and 138/1, a circuit is closed through 134, 132, 125, 126, 1b, 1a, 105, 106 so that electromagnetic means 116/1 is energized and roller 115/1 is placed in the path of projection 104 so that carriage 96 is turned, as shown in FIG. 18, and drops pin 1 which falls into hopper 113/1. This circuit was closed, since magazine 141/1 was empty so that the indicator 144/1 and the higher indicator 145/1 indicated this condition of the magazine by closing a corresponding contact in the circuit. If the magazines are filled with pins, the indicators open corresponding contacts, not shown, in the circuit to prevent the energizing of electromagnetic means 116.

Pin indicator 140/1 is actuated by the pin dropping into hopper 113/1, so that the circuit of electromagnetic means 116/1 is interrupted, and roller 115/1 is retracted to its inoperative position. Pin 1 passes through hopper 113/1 and rolls over the distributor roller guide 114/1 to magazine 141/1 engages the higher blocking member 143/1 and operates the higher pin indicator 145/1 through a contact of the higher blocking member 143/1 so that pin 1 is free to drop to the lower blocking member 142/1 to close the contact of the lower indicator 144/1.

If during further distribution of pins, another pin 1 was dropped into the magazine, the indicators 144/1 and 145/1 produce a controlling process and indicate that the entire magazine 141/1 is filled, which is necessary since three or four complete sets of pins circulate in the setting apparatus. If a third and fourth pin 1 arrives at the distributing station 110, they are not dropped, but remain in carriages 96 to move on with the endless elevator band 83. At the distributing stations associated with pins 6, 8 and 9 corresponding circuits are formed as described with reference to the station of pin 4, so that the respective locking relays 117/9, 8 and 6 prevent the dropping of pins. At the sub-station associated with the higher pin 5, standard pins 4, 6 to 9, and also pins 1 to 3 pass, since only the longer pins 5 shift member 125, 126 to the right in which contacts 131, 132 cooperate with contacts 134, 135 which slide on contacts 136 and 137/5. Similarly, pins 2 and 3 are only dropped at the corresponding sub-stations, since the annular contact 1c is engaged by contact 108 of the carriage 96 which is connected to slide contact 109 cooperating with contacts 139.

The control device can also be electronically operated, in which event pins 1 to 9 contain different small oscillating circuits to which the sensing means respond differently.

When feelers 21/1 to 9 in the support 15 of the pins move to the projecting position indicating that no pins are standing on support 15/1 to 15/9, corresponding control impulse is transmitted to the magazines 141/1 to 141/9 whenever the rules of the game require the setting of pins 1 to 9 on empty supports 15/1 to 9. At this moment, the plate 14 has raised through members 19 the rings 16 and tubes 146, the blocking fingers 17 and the protecting projections 26 are withdrawn, and the sweeping member 18 has performed its sweeping motion, if such motion was necessary.

When the lower locking members 142/1 to 142/9 release pins 1 to 9, the same drop into the tubes 146/1 to 9 and fall between the centering members 147/1 to 147/9 which slow down the fall of the pins and at the same time exactly place the pins at the center of the support plates 15. Plates 14 move downward, while the centering means 147/1 to 9 are retracted by levers 148/1 to 9 through control rolls 150/1 to 9. The exact moment of the downward movement of plate 14 is determined by a time relay.

In a preferred embodiment of the invention, all magazines 141/1 to 9 are mounted on a common plate, and can be turned together with the roller guides 114/1 to 9 to a laterally displaced position in which they are not in the way of a pin boy in the event that the pins are to be set by a pin boy.

It will be understood that each of the elements described above, or two or more together, may also find a useful application in other types of pin setting arrangements differing from the types described above.

Referring now to the diagram of FIGS. 25a, 25b showing the electric circuit of the apparatus, when a ball closes contact switch 225 of member 23, the relay 207 is energized, opens contact 208 and closes contacts 209, 210. Contact 209 maintains the current in the relay 207 through contact 205a. Closing of contact 210 energizes relay 223, so that it closes contact 230. All magnets 226 are energized, so that the protecting pins 26 advance. At the same time, the electro-magnets 22 are energized so that the feelers 21 advance. It is assumed that only pin 4 is dropped, so that feeler 21/4 moves upward out of the position shown in FIG. 25a engaging the lower contact 227 and closes the upper contact 227 which energizes relay 215 so that contacts 216, 217 and 218 are closed. No current flows at first through contact 216. Contact 217 holds electro-magnet 215 energized. Contact 218 energizes electro-magnet 19 and engages with its armature 19' the bracket 79. Armature 19' corresponds to the armature of electro-magnetic means 19 shown in FIG. 5.

Closing of contact 230 energizes motor 201 which raises plate 14 to its upper position. As shown in FIG. 25a, the raising plate 14 moves member 163 to a position engaging and actuating switch 205a, 205b.

When contact 205a is opened, and contact 205b is closed after the plate 14 is raised, arm 163 also closes contact 206.

When the contact 205a opens, electro-magnet 207 is disconnected, so that contacts 209 and 210 open, and contact 208 closes.

The opened contact 210 interrupts the circuit of electro-magnet 223, so that contact 230 opens, and motor 201 stops. When contacts 230 open, the electromagnetic means 22 is disconnected, so that feelers 21 drop by the action of gravity. Electromagnetic means 226 is also deenergized by the open contacts 230 so that pins 28 drop down by the action of gravity.

Closing of contact 205b energizes electro-magnet 222 so that contact 228 is closed. Thereby, all electro-magnets 99 are energized and advance the blocking fingers 17 into the openings of rings 16.

Furthermore, closing of contact 205b energizes electro-magnet 224 which closes contact 231. Closing of this contact energizes motor 202 which operates the sweeping means 18 to sweep pin 4 from the raised plate 14 into the pit 20. The sweeping member 18 acts to close first contact 204 and then contact 203. When contact 204 closes, electro-magnet 211 is energized so that contact 212 opens and contacts 213 and 214 close.

Opening of contact 212 disconnects electro-magnet 222, and effects opening of contact 228, so that all electro-magnets 99 are de-energized and all blocking fingers 17 are retracted. Closing of contact 214 maintains electro-magnet 212 energized. Closing of contact 213 closes the circuit of electro-magnet 229 through contact 216 so that the lower blocking means 142/4 is opened so that a new pin 4 drops from magazine 141/4 on to the support 15/4.

In the meantime, the sweeping member 18 has moved on and opens contact 203a, and closes contact 203b. Electro-magnet 215 is disconnected by contact 203a, and opens three contacts 216, 217 and 218.

Opening of contact 216 de-energizes electro-magnet 229 so that blocking means 142 is closed by spring 164.

Closing of contact 203b energizes electro-magnet 219 so that contacts 220 and 221 close. The circuit of contact 220 holds electro-magnet 219 energized through contact 206.

Closing of contact 221 energizes electro-magnet 223 which closes contact 230 starting motor 201 which lowers plate 14. Plate 14 opens contact 205b and closes contact 205a. Contact 205b de-energizes electro-magnet 224 so that contact 231 opens. The circuit of motor 201 is interrupted, and arm 163 opens contact 206. Initial position is thus restored.

Referring now to FIGS. 26a and 26b, the conductors shown in the lower portions of these figures are the continuations of the conductors shown in the diagram of FIG. 25, and are connected to the electro-magnets 215. Each pair of conductors is associated with the support of a certain pin, and correspondingly indicated by numbers 4, 2, 7, 1, 9, 5, 8, 3 and 6.

All elements illustrated in FIG. 26 are respectively associated with certain pins and supports for the pins. The circuit parts are repeated for each pin stand or pin magazine, and only the left portion of FIG. 26a is provided with reference numerals, while corresponding reference numerals are omitted in the remainder of FIG. 26a and FIG. 26b to avoid repetition, and for the sake of clarity. The reference numerals in FIG. 26a could have been provided with the subscript 4 indicating that they belong to the pin 4.

A pin 4, arriving at the distributing station 110, and having no inner conductors or contacts, is to be placed in the corresponding magazine, and finally in the proper position on the pin stand.

At the distributing station 110, the head 126 causes a pin 4 to abut against the stop 101. Consequently, member 125 assumes a position in which contact 131 engages the slide contact 133, and contact 132 engages the slide contact 134, to establish an electric circuit between the contacts 136 and 137.

Electro-magnet 116 is energized through contact 235, which is closed when the locking relay 117 is in its rest position, and advances the control roller 115 into the path of the control projection 104 so that the carriage 96 is turned. At the same time, contact 232 is closed which maintains the current in the electro-magnet 116, when contacts 133 and 134 have passed beyond contacts 137 and 136. In this manner, control roller 115 is held in the path of projection 104, when the electric connection between the contacts 136 and 137 is already interrupted. Carriage 96 is turned, and pin 4 drops out of the same and moves over the roller guide 114/14 to the magazine 141/4.

When pin 4 is at the roller guide 114, the indicator 140 is actuated which opens contact 233 momentarily. In this moment, in which the electro-magnet 116 is energized, roller 115 is moved by spring 168 out of the path of the following projection 104 so that the following carriage 96 is not turned. Since roller 115 returns to its position of rest, contact 232 simultaneously opens, so that the arrangement is again in its initial position.

The pin 4 rolls now over the roller guide 114/4 into the magazine 141/4, passing the locking device 143/4, and drops onto the lower locking device 142/4, where it is stopped. At the same time, the pin actuates the lower indicator 144/4 by engaging roller 165/4 which opens the contact switch 144/4 so that the electro-magnet 234 is de-energized. The pressure of spring 167/4 closes the locking device 143/4.

When another pin 4 is dropped at the distributing station 110, the same operations take place, but the respective pin is stopped by the closed locking device 143/4. The indicator roll 166/4 is actuated to open the indicator switch 145/4. Electromagnet 116/4 is disconnected, so that roller 115/4 cannot move into the path of a projection 104 even if contacts 136 and 137 are connected by a following device 122. As long as a pin rests on the locking device 143/4, no other pin can enter the magazine 141/4.

When an impulse created by a feeler 21/4 arrives, and indicates that the support 15/4 is empty, and that a pin has to be supplied thereto, electro-magnet 229/4 is energized, as described above, and opens the lower locking device 142/4 so that pin 4 drops onto the support 15/4. The lower locking device 142/4 is then closed by the spring 164/4, as described above.

At the same time the contact 144 A/4 is closed. Since the pin has dropped out of magazine 141/4, indicating roller 165/4 has been returned to its position of rest, and has closed switch 144/4. Electro-magnet 234/4 is energized, and opens the locking device 143/4 so that the pin 4 stopped thereby, is released and drops onto the closed lower locking device 142/4.

The pin 4 resting on the lower locking device 142/4, presses the indicating roller 165/4 to the outside, so that contact 144/4 opens, and electromagnet 234/4 is de-energized. Spring 167/4 closes the higher locking device 143/4 so that another pin may be received.

After the pin has dropped from the higher locking device 143/4 to the lower locking device 142/4, the indicating roller 166/4 moves back to its position of rest, so that contact 145/4 is closed, and electro-magnet 116/4 can be energized, when a moving device 120 connects contact 136 with contact 137. In this manner, the initial position is restored.

A pin 4 is not dropped at the distributing points for pins 2, 1 and 3, because at these points no contacts 137 are provided, so that the slide contacts 133 and 134 cannot close a circuit by which the distributing functions could be initiated.

At the distributing sub-station for pin 5, a pin 4 cannot be dropped, because contacts 137/5 cannot be reached by contacts 133 and 134 due to the particular length of this pin.

At the distributing points of pins 7, 9, 8 and 6, the same contact arrangement is provided as at the distributing station for pin 4. Consequently, a pin corresponding in shape to pin 4, would be dropped at these stations, this, however, is intended because pins 4, 7, 9, 8, and 6 are identical and interchangeable.

At the point where a pin 5 is to be dropped, the respective control contact 137/5 is displaced. Pin 5, the king pin, is longer than the other pins, and when a sensing member 125 abuts with its head 126 against the longer pin 5, contact 131 is connected with contact 134, and contact 132 is connected with contact 135. Contact 135 is located in the path of contact 137/5. Consequently, the control circuit, which initiates the operations, is only closed at the point where contact 137/5 is located. The functions thus initiated are the same as described for pin 4.

Pin 1 is different from the above discussed pins, since it has a conductor 1d connecting the top contact 1b with the bottom contact 1a. When pin 1 passes the distributing point of pin 4, contact 131 of sensing member 125 is connected with slide contact 133, and contact 132 is connected with slide contact 134, as described above for pin 4, since pin 1 has the same length as the pin 4. The circuit between the two contacts 136/4 and 137/4 is closed, but at the same time a further circuit is closed by the conductor 1d of pin 1 and contact 138/4, so that the locking relay 117/4 is energized. Thereby, contact 235/4 is opened, the electro-magnet 116/4 is de-energized so that the control roller 115/4 cannot move into the path of the control projection 104. As a result, pin 1 is not dropped at the distributing station for pin 4.

When pin 1 moves to the distributing station of pin 2, the circuit cannot be closed, since no contact 137 is provided at this point, so that the respective control roller 115/2 cannot be advanced, and the respective carriage 96 cannot drop a pin 1.

When pin 1 arrives at the distributing station of pin 7, the same conditions prevail as at the distributing station of pin 4, and pin 1 is not dropped.

When pin 1 passes finally to the respective associated distributing station, the circuit is closed through contacts 136/1 and 138/1 and electromagnet 116/1 is energized. The control roller 115/1 is placed in the path of projection 104, so that the carriage 96 is turned to drop pin 1, and the further operations take place as described above with reference to pin 4.

Pin 2 does not have the conductor connecting the top and bottom contacts, as pin 1, but it has an annular contact which is connected with the top contact by conductor 1e.

When a pin 2 in a carriage 96 passes over the distributing station of pin 4, contact 131 is connected with slide contact 133, and contact 132 is connected with slide contact 134, so that the electric connection between the contacts 136/4 and 137/4 is maintained, as is the case for all pins, except the king pin 5.

However, at the same time, a circuit is closed through members 125, 126, top contact 1f, connector 1e, ring contact 1c of pin 2, the slide contact 109, and contact 139/4 so that the locking relay 117/4 is energized, and disconnects, as above described, the electro-magnet 116/4 so that the roller 115/4 is not advanced into the path of the projection 104, and pin 2 is not dropped at the distributing station of pin 4.

During its further transport, pin 2 arrives at the associated distributing station. An electrical connection between contacts 136/2 and 139/2 is established, as described above, so that electro-magnet 116/2 is energized, and roller 115/2 is advanced into the path of projection 104. Consequently carriage 96 is turned, and pin 2 is dropped, as described for the other pins.

When the magazine 141/2 is filled with two pins, no additional pin 2 is dropped, but it is carried on by the respective carriage 96. Dropping of a pin 2 at the distributing stations for pins 7, 9, 8, and 6 is prevented as described above with reference to pin 4. Pin 2 is not dropped at distributing station 1, since no contacts 137 and 139 are provided at this station. Since pin 2 does not have a conductor connecting the top and bottom contacts, no connection is established at station 1 with the contact 138/1. At the distributing station for the king pin 5, pin 2 cannot be dropped because it is shorter than the pin 5 so that no contact can be established with contact 137/5.

It is possible to drop a pin 2 at the distributing station for pins 3, but there is no objection to that since pins 2 and 3 are identical, and interchangeable.

While the invention has been illustrated and described as embodied in an automatic pin setting arrangement for setting pins in associated places without removing pins which remain standing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An automatic pin setter comprising a support for supporting pins on selected places; at least one set of pins, selected pins of said set of pins having contacts connected to each other; placing means for placing pins on said places of said support; and control means controlling said placing means and including a circuit having feeler contacts adapted to engage said contacts on said pins so that said placing means places each pin on a correlated place of said support.

2. In an automatic pin setting arrangement, in combination, a plate having a set of openings arranged in a selected pattern, said plate being movable between a lower position and a higher position; first moving means for moving said plate between said positions; a set of annular members arranged in said selected pattern, and being movable between a lower position and a higher position independently of each other, annular members in said lower position being located in said openings of said plate in said lower position of the same, and annular members in said higher position thereof being located in said openings of said plate in said higher position of said plate; means for moving selected annular members independently of other annular members to and from said higher position; a set of stationary supports arranged in said selected pattern and being, respectively, located in said openings of said plate when the same is in said lower position, and being surrounded by said annular members when the same are in said lower position, each of said stationary supports having an opening; a set of feeler means respectively located in said openings of said stationary supports, each feeler means having a first position flush with the respective support, and being biased to move to a second position projecting above the respective support, each feeler means being adapted to be held in said first position by the weight of a pin on the respective support, and to move to said second position when the respective pin is dropped, each feeler means being operatively connected to the respective means for moving the respective annular member to said higher position so that said annular members move to said higher position together with said plate when the respective pin is dropped, while annular members partly supporting pins displaced from the respective supports are not raised to said higher position permitting said displaced pins to remain standing without being touched by said plate when the same moves to said higher position with dropped pins.

3. A pin setting arrangement as set forth in claim 2 and including a set of closure means arranged in said selected pattern, each closure means being movable between an inoperative position and an operative position projecting into an associated opening of said plate to at least partly close the respective opening; means for moving said closure means to said operative position when said plate is in said higher position whereby falling of dropped pins into said openings is prevented.

4. A pin setting arrangement as set forth in claim 2 wherein said means for moving said annular members between said lower and higher positions include a set of coupling means mounted on said plate and moving with the same, each coupling means being selectively movable between a disengaged position and a coupling position engaging the correlated annular member raising the same to said higher position when said plate moves to said higher position, each coupling means being operatively connected to the respective feeler means to be controlled by the same.

5. A pin setting arrangement as set forth in claim 2 wherein each of said stationary supports has a circular periphery and a flat top surface, wherein each of said annular members is a circular ring surrounding a correlated support directly adjacent the same, and wherein each opening of said plate has an inner circular edge directly adjacent a correlated annular member, and wherein the top surfaces of said plate, of said annular members, and of said stationary supports are planar and flush in said lower positions of said plate and of said annular members.

6. A pin setting arrangement as set forth in claim 2 and including sweeping means for sweeping said plate in said higher position of the same whereby dropped pins having been raised with said plate above standing pins are removed, while standing pins remain on said supports on a level below said higher position of said plate.

7. A pin setting arrangement as set forth in claim 2 and including switch means located at the level of said plate in said lower position and adapted to be operated by a bowling ball moving toward said plate, and circuit means connecting said switch means to said means for moving said plate between said lower and higher positions so that after a strike said plate is moved to said higher position together with dropped pins; and including sweeping means for sweeping said plate in said higher position of the same for removing dropped pins, said sweeping means being connected into said circuit to be operated after a strike when said plate arrives in said higher position.

8. A pin setting arrangement as set forth in claim 7 wherein said circuit of said switch means includes electromagnetic means for biasing said feeler means to move from said first position to said second position and back to said first position when said switch means is closed.

9. A pin setting arrangement as set forth in claim 8 and including means for supplying new pins into said openings of said plate and onto said stationary supports, said means for supplying pins being operatively connected to said feeler means and controlled by the same to supply pins only to those supports where said feeler means have moved to said second positions indicating the absence of a pin.

10. A pin setting arrangement as set forth in claim 9 wherein said annular members include rings flush in said lower position of said annular members with said supports, and with said plate in said lower position of the same, and tubular members projecting downwardly from said rings and adapted to surround pins on the respective correlated supports when said annular members are in said higher position, and also adapted to guide pins supplied by said supply means to supports from which said pins have dropped onto said plate for raising and removal.

11. A pin setting arrangement as set forth in claim 10 and including a set of closure fingers arranged in said selected pattern and mounted on said plate for movement between a retracted position and an advanced position projecting into a correlated opening of said plate, whereby the openings of said plate are covered by said fingers and dropping of pins into said openings onto standing pins is prevented.

12. A pin setting arrangement as set forth in claim 2 and including a set of tubular members arranged in said selected pattern, each tubular member being located below a correlated annular member, each tubular member being movable between a lower position and a higher position, and engaging the correlated annular member for moving the same between said lower position and said higher position of the same, each tubular member having a support of said set of supports correlated therewith and located at the center thereof so that the respective stationary support is surrounded by the respective tubular member when the same is raised to said higher position whereby new pins dropped into said tubular members in said higher positions are guided onto said supports.

13. A pin setting arrangement as set forth in claim 12 wherein said tubular members are fixedly secured to the respective correlated annular members, each tubular member having a cylindrical inner surface having the same diameter as the inner circular edge of the respective annular member.

14. An automatic pin setter comprising a set of pins including a plurality of different pins, each of said different pins having a distinguishable characteristic; a support for supporting said set of pins and including supporting members respectively associated with said pins, each of said different pins being associated with a correlated supporting member and standing on the same in such a manner as to be adapted to be dropped by a ball; means for removing dropped pins; and setting means including feeler means responsive to said distinguishable characteristics of said different pins for selectively setting said different pins on the respective correlated supporting members.

15. A pin setting arrangement as set forth in claim 14 and including a means located adjacent said support for receiving removed dropped pins, said means including a passage having a selected width permitting the passage of pins, but adapted to block the passage of bowling balls; means connecting the end of said passage with said setting means for transporting pins to said setting means; and means at the beginning of said passage for collecting bowling balls.

16. A pin setting arrangement as set forth in claim 15 wherein said pin receiving means includes a first inclined surface for guiding bowling balls and pins, a member forming said passage with said first inclined surface and adapted to guide bowling balls along said first inclined surface, and a second inclined surface below said first inclined surface and said member, said second inclined surface being adapted for guiding pins, and parallel rods extending along fall lines of said second inclined surface for orienting pins moving down said second inclined surface so that the pins are oriented at the lower end of said second inclined surface in one direction transverse to said fall lines, and said transporting means including means at the lower end of said second inclined surface for moving said pins in said one direction.

17. A pin setting arrangement as set forth in claim 16 and including means cooperating with said transporting means for turning pins which are in an undesired position through 180° about an axis transverse to said pins so that all pins on said transporting means have corresponding ends leading and trailing.

18. A pin setting arrangement as set forth in claim 17 wherein said transporting means includes elevator means for raising pins from said moving means to a higher level, said elevator means including an endless band and pin supporting means on said endless band, the number of said pin supporting means exceeding the number of pins in a set so that said elevator means serves as a temporary storage for pins.

19. An automatic pin setting arrangement as set forth in claim 18 wherein said setting means includes magazine means for pins arranged in said selected pattern over said openings in said support plate, respectively, and wherein said transporting means includes distributing means for pins for distributing pins transported by said elevator means into said magazine means.

20. In an automatic pin setting arrangement in combination, a support at a lower level for supporting a set of pins in a selected pattern; magazine means and guide means arranged in said selected pattern at a higher level for guiding pins to selected places of said support; distributing means for distributing pins in said magazine means and in said guide means, said distributing means including an endless band, means for moving said endless band along an endless path to said magazine means, a contact device on said endless band moving with the same, stationary contacts cooperating with said contact device, and stationary contacts in the region of said elevator means; means for removing dropped pins from said support; elevator means for raising removed dropped pins to the level of said distributing means and for supplying pins to said endless band and pins transported by said elevator means and having contacts and conductors connecting said contacts, said contact device engaging a contact of a pin transported by said elevator means for closing a circuit whereby the respective pin is placed in a correlated magazine means.

21. A pin setting arrangement as set forth in claim 20 and including means for connecting said elevator means and said endless band for synchronous movement.

22. An automatic pin setter comprising a set of pins including a plurality of different pins, each of said different pins having a distinguishable characteristic; a support for supporting said set of pins and including supporting members respectively associated with said pins, each of said different pins being associated with a correlated supporting member and standing on the same in such a manner as to be adapted to be dropped by a ball; and setting means including feeler means responsive to said distinguishable characteristics of said different pins for selectively setting said different pins on the respective correlated supporting members.

23. An automatic pin setter comprising a support for supporting a set of pins on selected places, a set of pins, at least some of said pins being constructed to have characteristics distinguishing them from others of said set; sensing means responsive to said characteristics of said pins; and setting means controlled by said sensing means for selectively setting the thus distinguished groups of one or more pins on respective predetermined different groups of one or more places of said support.

24. An automatic pin setter comprising a plurality of pins at least some of which are constructed to have characteristics distinguishing them from the others; a support having a plurality of supporting areas adapted to support pins, said supporting areas being intended to be associated with different pins, respectively; means for removing dropped pins; and setting means including means responsive to the sensing of said characteristics for selectively setting said pins having said distinguishing characteristics on different associated predetermined supporting areas.

References Cited in the file of this patent

UNITED STATES PATENTS

| | | |
|---|---|---|
| 975,445 | McFarland | Nov. 15, 1910 |
| 1,022,083 | Hobbs | Apr. 2, 1912 |
| 1,468,212 | Redfield | Sept. 18, 1923 |
| 2,052,584 | Smith | Sept. 1, 1936 |
| 2,641,471 | Timberlake | June 9, 1953 |